United States Patent
Toba

(10) Patent No.: US 12,244,238 B2
(45) Date of Patent: Mar. 4, 2025

(54) POWER CONVERSION SYSTEM

(71) Applicant: FUJI ELECTRIC CO., LTD., Kanagawa (JP)

(72) Inventor: Akio Toba, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 235 days.

(21) Appl. No.: 18/158,629

(22) Filed: Jan. 24, 2023

(65) Prior Publication Data
US 2023/0170818 A1 Jun. 1, 2023

Related U.S. Application Data

(63) Continuation of application No. PCT/JP2022/004110, filed on Feb. 2, 2022.

(30) Foreign Application Priority Data

Feb. 17, 2021 (JP) ................... 2021-023112

(51) Int. Cl.
*H02M 5/458* (2006.01)
*B60L 50/51* (2019.01)
(Continued)

(52) U.S. Cl.
CPC ............ *H02M 5/458* (2013.01); *B60L 50/51* (2019.02); *H02M 1/08* (2013.01); *H02M 7/4818* (2021.05);
(Continued)

(58) Field of Classification Search
CPC .. H02M 5/458; H02M 7/4818; H02M 7/5395; H02M 1/08; B60L 50/51; B60L 2200/10; B60L 2200/20; B60L 2200/40
(Continued)

(56) References Cited

U.S. PATENT DOCUMENTS

| | | | |
|---|---|---|---|
| 2006/0044848 A1* | 3/2006 | Suzuki | H02M 7/003 363/37 |
| 2007/0159129 A1* | 7/2007 | Jadric | H02M 5/4585 318/701 |

(Continued)

FOREIGN PATENT DOCUMENTS

| | | |
|---|---|---|
| DE | 69832428 | 7/2006 |
| EP | 0866284 | 9/1998 |

(Continued)

OTHER PUBLICATIONS

International Search Report mailed on Apr. 19, 2022 with respect to PCT/JP2022/004110.
(Continued)

*Primary Examiner* — Yemane Mehari
(74) *Attorney, Agent, or Firm* — IPUSA, PLLC

(57) ABSTRACT

A power conversion system in which a converter and an inverter are coupled to each other via a DC coupling unit that has an inductance component is provided. A switching frequency of each of the converter and the inverter is set to be the same and the switching frequency is set to be higher than a resonance frequency of a resonance circuit that includes a first capacitor, a second capacitor, and the DC coupling unit such as a cable. A switching operation of at least one of the converter or the inverter is controlled such that phases of predetermined components of voltage ripples, at the first capacitor and the second capacitor, that are respectively generated by switching operations of the converter and the inverter are substantially matched.

18 Claims, 15 Drawing Sheets

(51) Int. Cl.
*H02M 1/08* (2006.01)
*H02M 7/48* (2007.01)
*H02M 7/5395* (2006.01)

(52) U.S. Cl.
CPC ....... *H02M 7/5395* (2013.01); *B60L 2200/10* (2013.01); *B60L 2210/20* (2013.01); *B60L 2210/40* (2013.01)

(58) Field of Classification Search
USPC .......................................................... 363/34
See application file for complete search history.

(56) References Cited

U.S. PATENT DOCUMENTS

| 2020/0235655 | A1 | 7/2020 | Hayashi | |
| 2020/0235669 | A1* | 7/2020 | Liu | H02M 3/1584 |

FOREIGN PATENT DOCUMENTS

| EP | 1978628 | 10/2008 |
| JP | H04-121065 | 4/1992 |
| JP | H11-018435 | 1/1999 |
| JP | 2006-067754 | 3/2006 |
| JP | 2006-288035 | 10/2006 |
| JP | 2008-259343 | 10/2008 |
| JP | 4373040 | 11/2009 |
| JP | 2013-207962 | 10/2013 |
| JP | 2017-204976 | 11/2017 |

OTHER PUBLICATIONS

Written Opinion of The International Searching Authority mailed on Apr. 19, 2022 with respect to PCT/JP2022/004110.
Extended European Search Report mailed on Jan. 18, 2024 issued with respect to the corresponding European Patent Application No. 22755945.7.

* cited by examiner

POWER CONVERSION SYSTEM

CROSS-REFERENCE TO RELATED APPLICATION

This application is a continuation application of International Application No. PCT/JP2022/004110, filed on Feb. 2, 2022, and designating the U.S., which is based upon and claims priority to Japanese Patent Application No. 2021-023112, filed on Feb. 17, 2021, the entire contents of which are incorporated herein by reference.

BACKGROUND

1. Field of the Invention

The present disclosure relates to a power conversion system in which an AC-DC-AC conversion is performed with a converter and an inverter that are used in pulse width modulation (PWM) control to drive an AC motor. More particularly, the present disclosure relates to techniques for reducing pulsations in the current flowing through a DC circuit between the converter and the inverter.

2. Description of the Related Art

A type power conversion system has been provided including various power conversion systems. If frequencies of carrier waveforms with which the converter and the inverter are used in the PWM control differ from each other, pulsations in the current flowing through a capacitor (in a case of a voltage type system) or a reactor (in a case of a current type system) of a DC circuit between the converter and the inverter are increased, and thus the control becomes unstable. In this case, it is known that capacitance required for the capacitor or the reactor is increased.

For example, Patent Document 1 describes reducing pulsations in the current through a DC circuit, where a converter-side carrier waveform and an inverter-side carrier waveform are the same or inverted waveforms, or the converter-side carrier waveform and the inverter-side carrier waveform have a predetermined phase difference at the same frequency.

Also, in order to suppress a resonant current flowing through a DC circuit between the converter and the inverter, Patent Document 2 describes matching frequencies and phases of corresponding carrier waveforms for the converter and the inverter, as well as adding a DC capacitor or the like to the DC circuit such that the resonant current is reduced when a phase difference between two carrier waveforms is zero.

Patent Document 3 discloses a DC power transmission system in which voltage-smoothing capacitors are respectively provided in DC voltage units of a converter and an inverter that are coupled via a DC power transmission line. The capacitors suppress DC voltage surges caused by switching operations of the converter and the inverter to prevent overvoltage breakdown in any element, as well as functioning to stabilize the DC voltage during variations in an AC power supply or a load power.

RELATED-ART DOCUMENTS

Patent Document

[Patent Document 1] Japanese Unexamined Patent Application Publication No. H4-121065 (top left column, line 20, of page 5 to top left column, line 1, of page 6, FIGS. 1 and 8, and the like)

[Patent Document 2] Japanese Unexamined Patent Application Publication No. 2017-204976 (paragraphs 0007 and 0008, FIGS. 1 to 3, and the like)

[Patent Document 3] Japanese Patent No. 4373040 (paragraph 0009, FIG. 1, and the like)

SUMMARY

Aspects of the present disclosure are as follows. A first aspect relates to a power conversion system. The power conversion system includes:
an AC power supply;
a converter configured to convert AC power of the AC power supply into DC power, by PWM control;
an inverter configured to convert the DC power output from the converter into AC power, by PWM control, to supply the AC power to an AC motor;
a first capacitor coupled in a DC voltage unit of the converter;
a second capacitor coupled in a DC voltage unit of the inverter; and
a DC coupling unit that connects the first capacitor and the second capacitor, the DC coupling unit including an inductance component,
wherein a switching frequency of each of the converter and the inverter is set to be the same and the switching frequency is higher than a resonance frequency of a resonance circuit that includes the first capacitor, the second capacitor, and the DC coupling unit, and
wherein a switching operation of at least one of the converter or the inverter is controlled such that phases of predetermined components of voltage ripples, at the first capacitor and the second capacitor, that are respectively generated by switching operations of the converter and the inverter are substantially matched.

A second aspect relates to a power conversion system of a first aspect, wherein a PWM pulse to be applied to each of the converter and the inverter is generated by comparing a voltage command against a carrier waveform, and
wherein a converter-side carrier waveform and an inverter-side carrier waveform are set to have a same frequency, the converter-side carrier waveform and the inverter-side carrier waveform having a predetermined phase relationship.

A third aspect relates to a power conversion system of a second aspect, wherein the number of phases for each of the AC power supply and the AC motor is set to be the same,
wherein at least one of the converter or the inverter is controlled such that respective fundamental waves of one-phase voltages of the AC power supply and the AC motor have a same frequency and are substantially in phase, and
wherein respective phases of the converter-side carrier waveform and the inverter-side carrier waveform are set to be opposite to each other.

A fourth aspect relates to the power conversion system of the second aspect, wherein the number of phases for each of the AC power supply and the AC motor is set to be the same,
wherein at least one of the converter or the inverter is controlled such that respective fundamental waves of one-phase voltages of the AC power supply and the AC motor have a same frequency and are substantially opposite in phase, and
wherein phases of the converter-side carrier waveform and the inverter-side carrier waveform are matched.

A fifth aspect relates to a power conversion system of any one of first to fourth aspects, wherein at least one of the converter or the inverter includes a plurality of power conversion units in which respective DC voltage units are coupled in parallel.

A sixth aspect relates to a power conversion system of a fifth aspect, wherein a switching frequency of each of the plurality of power conversion units is set to be the same, and
  wherein timings of pulses that are respectively generated in DC bus currents in the plurality of power conversion units, which constitute the converter or the inverter, are staggered.

A seventh aspect relates to a power conversion system of a sixth aspect, wherein the timings of the pulses that are respectively generated of the DC bus currents in the plurality of power conversion units are substantially uniformly distributed.

An eighth aspect relates to a power conversion system of a sixth aspect, wherein respective switching frequency components of voltage ripples at the first capacitor of the converter and the second capacitor of the inverter are substantially in phase, and
  wherein harmonic components of switching frequencies are canceled by staggering the timings of the pulses that are respectively generated in the DC bus currents of the plurality of power conversion units.

A ninth aspect relates to a power conversion system of a sixth aspect, wherein switching frequency components of a given voltage ripple at the first capacitor or the second capacitor are canceled by staggering the timings of the pulses that are respectively generated in the DC bus currents of a corresponding plurality of power conversion units, and
  wherein harmonic components of a given switching frequency are canceled by setting the harmonic components to be substantially in phase.

A tenth aspect relates to a power conversion system of any one of sixth to ninth aspects, wherein a PWM pulse that is applied to each of the plurality of power conversion units is generated by comparing a voltage command against a carrier waveform, given carrier waveforms being set to have a same frequency, and a predetermined phase relationship being provided between the given carrier waveforms, and
  wherein carrier waveforms used for the converter and the inverter are set to have a same frequency, the carrier waveforms having a predetermined phase relationship.

An eleventh aspect relates to a power conversion system of a tenth aspect, wherein the number of phases for each of the AC power supply and the AC motor is set to be the same and a frequency of a fundamental wave of each AC-side voltage is set to be the same, and
  wherein for the plurality of power conversion units in each of the converter and the inverter, an amplitude of the fundamental wave of a corresponding AC-side voltage is set to be substantially the same and an amplitude of a fundamental wave of a corresponding AC-side current is set to be substantially the same.

A twelfth aspect relates to a power conversion system of any one of fifth to eleventh aspects, wherein, in a case where a portion of the plurality of power conversion units is stopped, phases of predetermined components of respective voltage ripples due to switching, for the first capacitor of the converter and the second capacitor of the inverter, are controlled so as to be substantially matched.

A thirteenth aspect relates to a power conversion system of any one of first to twelfth aspects, wherein the AC power supply is an AC generator that is driven with an external force, and
  wherein a current generated by the AC generator is controlled by the converter such that an average magnitude of a DC voltage of the converter or the inverter is set to be a predetermined magnitude, a frequency of the current generated by the AC generator being provided to the inverter as a magnitude that corresponds to a frequency command for the AC motor.

A fourteenth aspect relates to a power conversion system of any one of first to twelfth aspects, wherein the AC power supply is an AC generator that is driven with an external force, and
  wherein a current generated by the AC generator is controlled by the converter such that an average magnitude of a DC voltage of the converter or the inverter is set to a predetermined magnitude, a frequency of a current of the AC motor being provided to a controller for the external force, and the frequency being used as a magnitude that corresponds to a frequency command for the AC generator.

A fifteenth aspect relates to a power conversion system of a thirteenth or fourteenth aspect, wherein an amount corresponding to output power of the inverter is added to an amount corresponding to an input power command for the converter.

A sixteenth aspect relates to a power conversion system of any one first to fifteenth aspects, wherein an amount corresponding to output power of the inverter is added to an amount corresponding to an input power command for the converter.

A seventeenth aspect relates to a power conversion system of any one of the first to sixteenth aspects, wherein at least one of
  a mutual phase relationship between carrier waveforms that are respectively used in the PWM control for the converter and the inverter,
  a mutual phase relationship between respective fundamental waves of AC-side voltages of the converter and the inverter, or
  a mutual phase relationship between respective fundamental waves of AC-side currents of the converter and the inverter, is adjusted so as to reduce a current ripple flowing through the DC coupling unit.

DESCRIPTION OF THE EMBODIMENTS

Related art information relevant to the present disclosure recognized by the inventor of this application will be provided below. Patent Document 1 does not disclose a system in which the converter and the inverter, each of which includes a capacitor in a DC voltage unit, are coupled to each other via a DC circuit, unlike in Patent Document 3.

In the related art described in Patent Document 2, in order to reduce a resonance current that is determined based on impedance of the DC circuit, a condition of two power systems, the voltage and current of each of the converter and the inverter, and the like, a simulation is formed to configure the DC circuit. However, the principle of suppressing the resonance current of the DC circuit is not specifically illustrated, and connectivity configurations and operations of the capacitor, a reactor, and the like that are coupled to the DC circuit are not clearly disclosed.

The related art described in Patent Document 3 is directed to an approach to suppress low-order harmonics flowing into an AC power supply system, by providing an active filter function in a control circuit for each of the converter and the inverter. This is not intended to reduce pulsations in the current through the DC circuit.

An object of the present disclosure is to provide a power conversion system with a resonance circuit that is constituted by a DC circuit (which is an example of a DC coupling unit), which is between a converter and an inverter, and capacitors that are coupled to corresponding DC voltage units of the converter and the inverter, and the power conversion system is capable of reducing pulsations in the current flowing through the DC circuit.

Embodiments of the present disclosure will be described below with reference to the drawings.

Figure 1A:
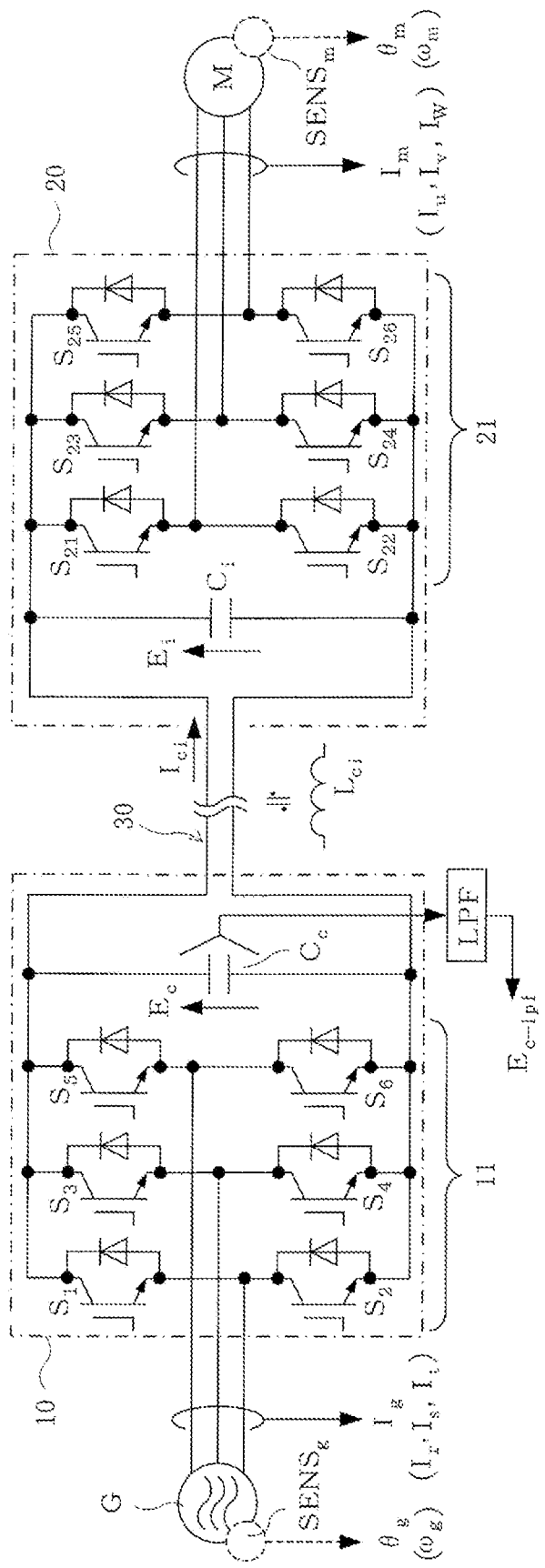
FIG. 1A is a diagram illustrating the configuration of the main circuit of a power conversion system according to one embodiment of the present disclosure.
Figure 1B:
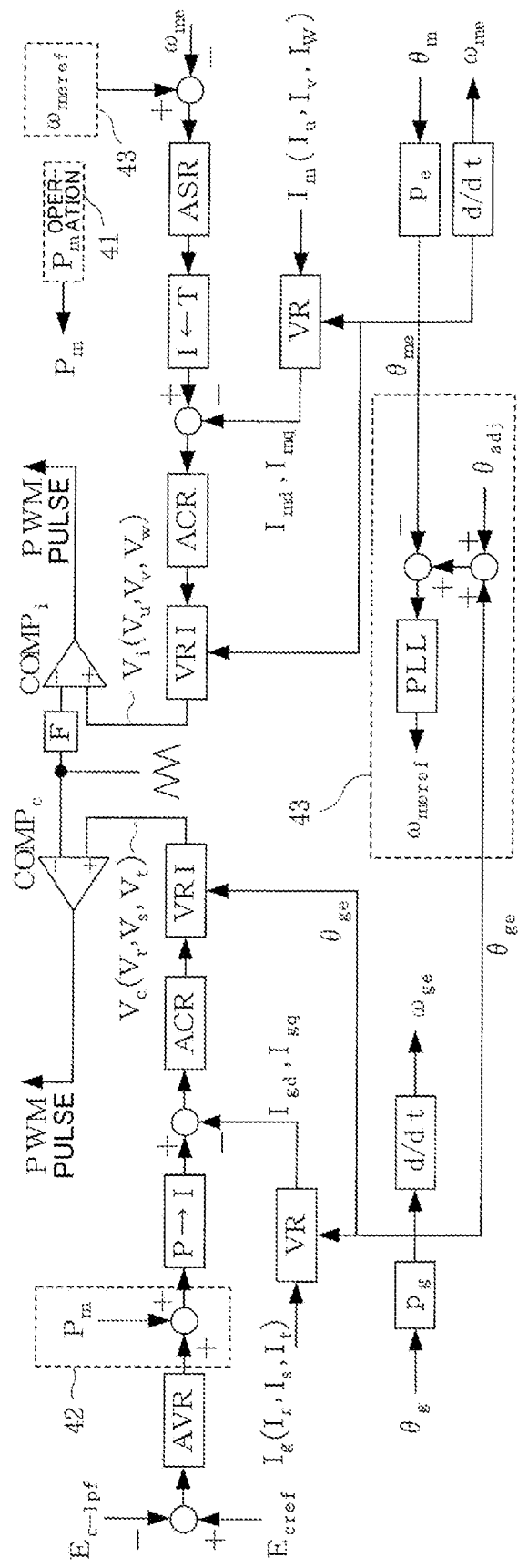
FIG. 1B is a block diagram illustrating the configuration of a control circuit of the main circuit of the power conversion system according to one embodiment of the present disclosure.

FIG. 1A is a diagram illustrating the configuration of a main circuit of a power conversion system according to one embodiment of the present embodiment. FIG. 1B is a block diagram illustrating an example of a control circuit of the main circuit.

In FIG. 1A, an AC power supply G includes a three-phase AC generator that provides a rotational force through an external force such as an engine. A three phase voltage-type converter (hereinafter also simply referred to as a converter) 10 is coupled to the AC power supply G, and a three phase voltage-type inverter (hereinafter also simply referred to as an inverter) 20 is coupled to a DC side of the converter 10 via a DC coupling unit 30 such as a cable. The DC coupling unit 30 is an example of a DC coupling unit. The inverter 20 converts DC power input via the DC coupling unit 30 into AC power, and outputs the AC power to an AC motor M, such as a three phase synchronous motor or an induction motor. The AC motor M generates predetermined torque to drive a load (not illustrated).

The converter 10 includes a power conversion unit 11 that includes semiconductor switching elements $S_1$ to $S_6$ (hereinafter also simply referred to as switching elements), such as IGBTs and FETs, coupled to constitute a three phase bridge, and that includes a voltage-smoothing capacitor Cc as a first capacitor that is coupled between DC terminals of the power conversion unit 11. The inverter 20 includes a voltage-smoothing capacitor $C_i$ as a second capacitor that is coupled to the capacitor $C_c$ via the DC coupling unit 30, and includes a power conversion unit 21 that includes switching elements $S_{21}$ to $S_{26}$ that are coupled between the two ends of the voltage-smoothing capacitor $C_i$, the switching elements $S_{21}$ to $S_{26}$ constituting a three phase bridge.

In such a configuration, the converter 10 converts an AC voltage into a DC voltage by turning the switching elements $S_1$ to $S_6$ on or off, smooths the DC voltage through the capacitor $C_c$, and supplies the DC voltage to the inverter 20 via the DC coupling unit 30. In the inverter 20, the DC voltage that is input to the inverter 20 is smoothed by the capacitor $C_i$, is converted into an AC voltage by turning the switching elements $S_{21}$ to $S_{26}$ on or off, and then is supplied to the AC motor M.

In the following, signs $C_c$ and $C_i$ are each used to indicate both a corresponding capacitor and capacitance. Also, $L_{ci}$ indicates inductance of the DC coupling unit 30. The inductance $L_{ci}$ includes inductance of a cable itself as the DC coupling unit 30, or inductance of both a DC reactor and the cable in a case where the DC reactor as a component is inserted in a middle portion of the cable.

(1) First Aspect of Embodiment

An aspect of the embodiment relates to a power conversion system with a resonant circuit (hereinafter also referred to as CLC resonant circuit) that includes the capacitors $C_c$ and $C_i$ and inductance $L_{ci}$ that are situated in a DC circuit between the converter 10 and the inverter 20, as illustrated in FIG. 1A. In this aspect of the embodiment, a switching frequency of each of the converter 10 and the inverter 20 is set to be the same, and the switching frequency is set to be higher than a resonant frequency of the CLC resonant circuit. Further, in the aspect of the embodiment, a switching operation of at least one of the converter 10 or the inverter 20 is controlled such that predetermined components of corresponding voltage ripples that result from the capacitors $C_c$ and $C_i$ upon switching the converter 10 and the inverter 20 are substantially in phase. With this arrangement, pulsations in a current $I_{ci}$ through the DC coupling unit 30, due to a difference between the above voltage ripples, are reduced.

The relationship between the resonant frequency of the CLC resonant circuit and the switching frequency of each of the converter 10 and the inverter 20 is first considered as follows.

When the switching frequency or its harmonic frequency matches the resonant frequency, an oscillating current through a loop that includes $C_c$, $C_i$ and $L_{ci}$ is increased without any limitations, and thus a device may be damaged due to an overvoltage at the capacitor $C_c$ or $C_i$ or an excess current in the loop. Even if such a situation can be avoided, there are cases where the switching frequency is lower than the resonance frequency. In this case, when seen from the power conversion unit 11 of the converter 10 or the power conversion unit 21 of the inverter 20, impedance of the inductance $L_{ci}$ at the switching frequency is smaller than that of the capacitor $C_c$ or capacitor $C_i$ that is provided in a corresponding DC voltage unit. With this arrangement, many current ripple components generated by the switching operation flow into the inductance $L_{ci}$, without being reduced by the capacitors $C_c$ and $C_i$. Thus, each of the capacitors $C_c$ and $C_i$ may be impaired with respect to function as an inherent voltage-smoothing element.

In view of the situation described above, setting the switching frequency of each of the converter 10 and the inverter 20 (power conversion units 11 and 21) to higher than the resonant frequency of the CLC resonant circuit is a requirement for stably operating the system.

The above configuration will be further described with reference to FIGS. 2 and 3.

Figure 2:
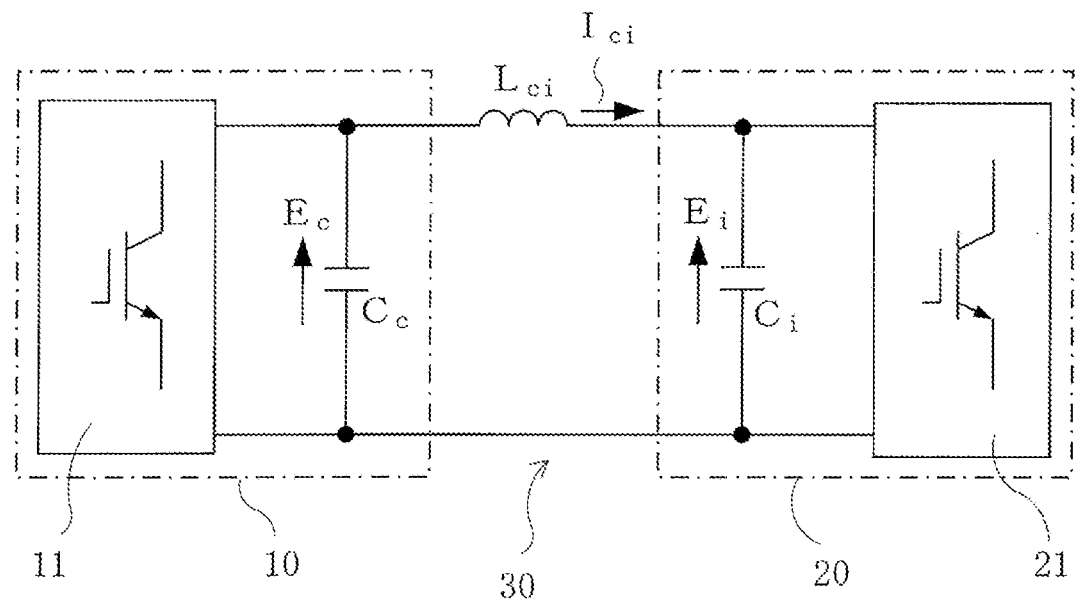
FIG. 2 is a diagram illustrating a circuit obtained by simplifying FIG. 1.

FIG. 2 is a diagram obtained by simplifying FIG. 1A. In FIG. 2, a frequency characteristic for an absolute value |Z| of impedance Z seen from a converter 10-side is illustrated, for example, in FIG. 3. When such a frequency characteristic is formulated, Equation 1 below is given. Likewise, impedance seen from an inverter 20-side is formulated, where in the numerator of the second fraction term on the right hand of Equation 1, $C_c$ is given instead of $C_i$.

$$Z = \frac{1}{j\omega(C_c + C_i)} \frac{1 - \omega^2 L_{ci} C_i}{1 - \omega^2 L_{ci} \frac{C_c C_i}{C_c + C_i}} \qquad \text{[Equation 1]}$$

From Equation 1, the impedance Z has two singular points. The frequencies at singular points are a frequency $f_{r1}$ ($\omega = \omega_{r1} = 2\pi f_{r1}$) at which |Z| is zero and another frequency $f_{r2}$ ($\omega = \omega_{r2} = 2\pi f_{r2}$) at which |Z| is infinite, and they are given by Equations 2 and 3, respectively.

$$f_{r1} = 1/(2\pi\sqrt{L_{ci} C_i}) \qquad \text{[Equation 2]}$$

$$f_{r2} = 1 / \left( 2\pi \sqrt{L_{ci} \frac{C_c C_i}{C_c + C_i}} \right) \qquad \text{[Equation 3]}$$

Figure 3:
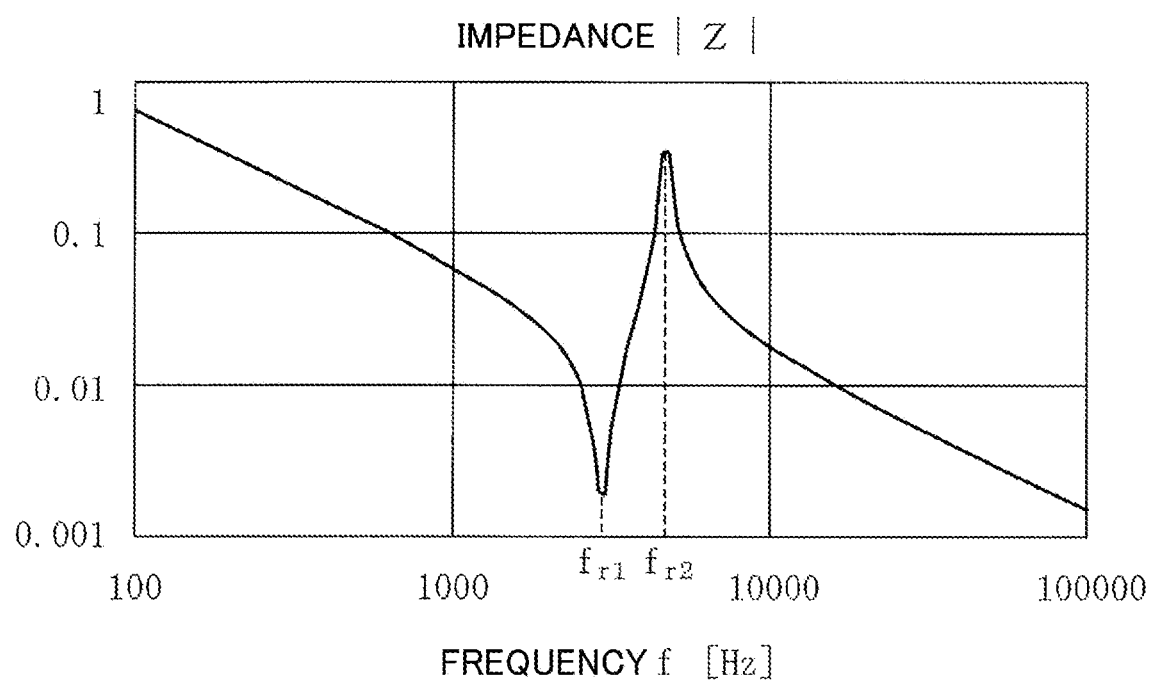
FIG. 3 is a diagram illustrating a frequency characteristic for an absolute value of impedance in FIG. 2.

In FIG. 3, |Z| is a finite value at a given singular point, in consideration of a resistance component of an actual circuit, but this does not result in any essential problem. Also, in general, because effects of the resistance component on the $L_{ci}$, $C_c$, and $C_i$ are small, the resistance component is negligible in the formulation.

In Equations 2 and 3, because the relation $f_{r1} < f_{r2}$ is necessarily satisfied, the switching frequency of each of the converter 10 and the inverter 20 needs to be higher than $f_{r2}$ in FIG. 3. That is, if the switching frequency matches $f_{r1}$ or $f_{r2}$, a resonance state is maintained to cause the overvoltage or excess current, and if the switching frequency is lower than $f_{r2}$, many current components caused by the switching operation flow into the inductance $L_{ci}$. In order to stably operate the system, it is desirable to set the switching frequency to be approximately twice or more $f_{r2}$ practically because, if the switching frequency of each of the converter 10 and the inverter 20 is close to $f_{r2}$, the resonant state is substantially maintained.

As clearly seen from FIG. 2, a difference between voltage ripples at the respective capacitors $C_c$ and $C_i$ due to the switching of the converter 10 and the inverter 20 is applied to the reactance $L_{ci}$. With this arrangement, by suppressing the above difference, pulsations in the current flowing into the reactance $L_{ci}$ can be reduced.

In FIG. 2 above, the power conversion unit 11 of the converter 10 and the power conversion unit 21 of the inverter 20 apply voltages that are controlled in the PWM, to the AC power supply G and the AC motor M, respectively, to directly or indirectly regulate the current. Typically, each of the AC power supply G and AC motor M themselves supplies voltages of a fundamental wave and its harmonics. A rectangular voltage that is formed in the PWM control is superimposed on the given voltages. With this arrangement, a difference between the above voltages is applied to a reactor or the like, which is coupled between the AC power supply G and the AC motor M, thereby smoothing the current. However, in many cases, an inductance component resulting from the AC power supply G and the AC motor M is substituted for the reactor or the like. Accordingly, in FIG. 2, the reactor or the like is omitted given the substitution, and only the inductance $L_{ci}$ resulting from the DC coupling unit 30 is illustrated.

In the above configuration, the current flowing from the AC power supply G to the converter 10, as well as the current flowing from the AC motor M to the inverter 20, are continuous. A pulsed current (hereinafter referred to as a chopped current), which is obtained by chopping the continuous current through the switching of each of the power conversion units 11 and 21, flows into a DC-circuit side, and then is input to the CLC resonant circuit that is constituted by the capacitors $C_c$ and $C_i$ and the inductance $L_{ci}$. A chopped current waveform is substantially determined based on the current of the AC power supply G and the switching of the power conversion unit 11, as well as on the current into the AC motor M and the switching of the power conversion unit 21. With this arrangement, the chopped current behaves as if it were a current source for the CLC resonant circuit.

Further, when the switching frequency of each of the power conversion unit 11 and 21 is set to be higher than the resonance frequency $f_{r2}$ of a corresponding CLC resonance circuit, the majority of the chopped current flows from the power conversion unit 11 into the capacitor $C_c$, while the chopped current flows from the power conversion unit 21 into the capacitor $C_i$. As a result, in each of the capacitors $C_c$ and $C_i$, a corresponding pulsating voltage is superimposed on a predetermined DC voltage. The DC component of the chopped current does not pass through the capacitors $C_c$ and $C_i$, while the DC component passes through the inductance $L_{ci}$ of the DC coupling unit 30 to be used between the converter 10 and the inverter 20. With this arrangement, when power need to be supplied to the AC motor M, the required power is supplied from the AC power supply G. In contrast, by a regenerative operation, power is supplied from the AC motor M to the AC power supply G.

The voltage ripples at the respective capacitors $C_c$ and $C_i$ due to the switching operations of the power conversion units 11 and 21 will be further described.

As clearly seen from the foregoing description, a difference between the voltage ripples at the capacitors $C_c$ and $C_i$ is applied to the inductance $L_{ci}$, and thus the resulting current ripple occurs. In this case, when the difference between the voltage ripples at the capacitors $C_c$ and $C_i$ is minimized, the current ripple through the inductance $L_{ci}$ can be reduced.

The voltage ripples at the capacitors $C_c$ and $C_i$ due to the switching of the power conversion units 11 and 21 have components relating to the corresponding switching frequencies. With this arrangement, in order to reduce the difference between the voltage ripples at the capacitors $C_c$ and $C_i$, it is sufficient to control the switching operations of the power conversion units 11 and 21 such that predetermined components of the voltage ripples at the capacitors $C_c$ and $C_i$ are substantially in phase. In this case, a "predetermined component" refers to a "main frequency component" or "frequency component that should be particularly reduced" among frequency components of a given voltage ripple at each of the capacitors $C_c$ and $C_i$. Alternatively, the predetermined component refers to a "temporal component" during a period in which a voltage amplitude is increased for a temporal waveform of a given voltage ripple.

Figure 4A:
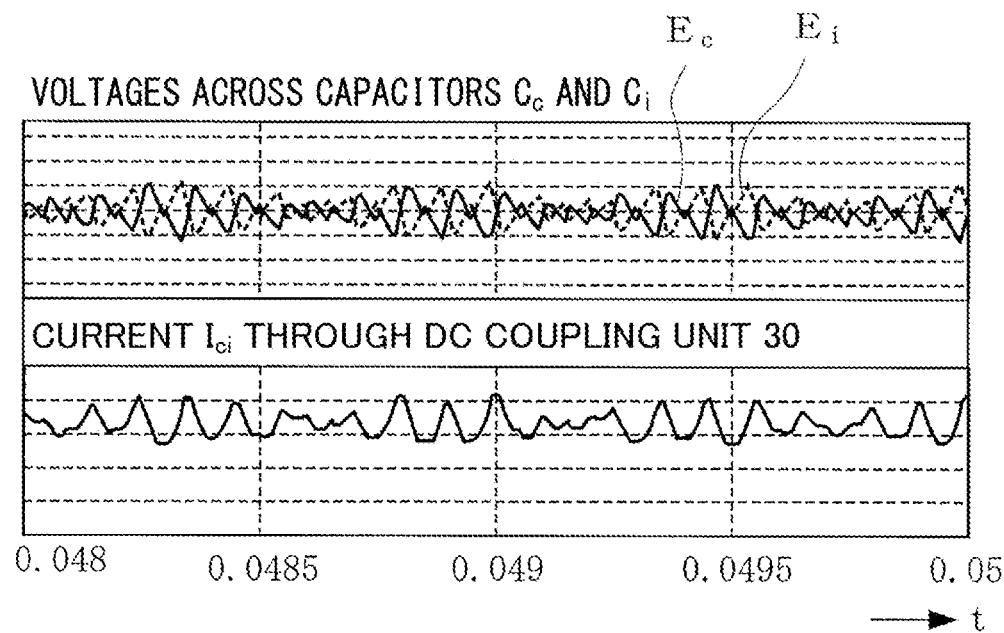
FIG. 4A is a waveform diagram illustrating voltages across a converter-side capacitor and an inverter-side capacitor and the current through a DC coupling unit.
Figure 4B:
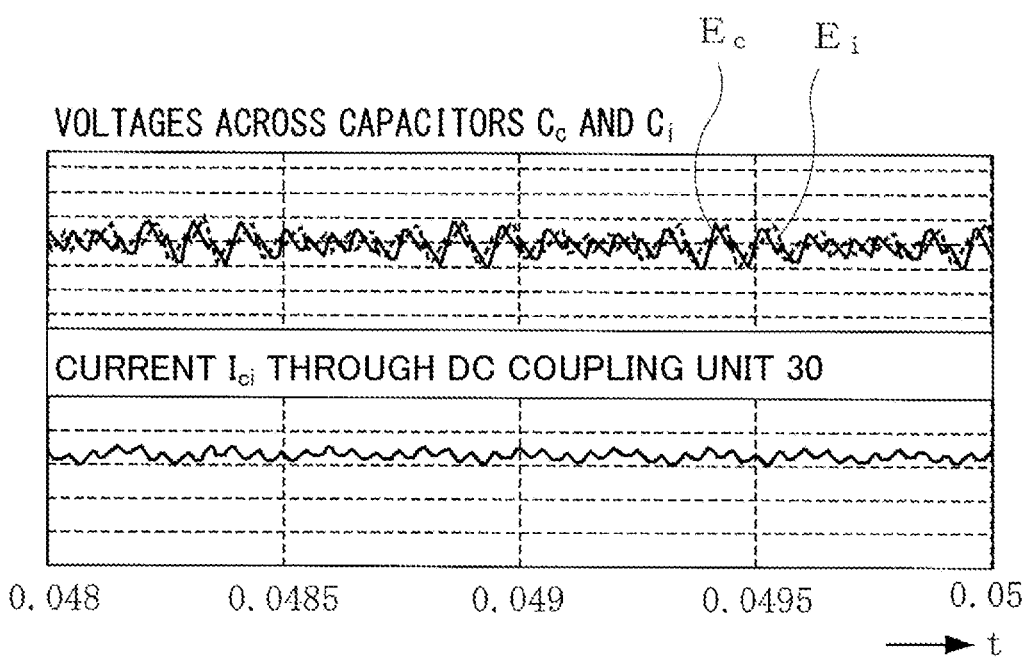
FIG. 4B is a waveform diagram illustrating the voltages across the converter-side capacitor and the inverter-side capacitor and the current through the DC coupling unit.

The above point is specifically illustrated in FIGS. 4A and 4B.

FIGS. 4A and 4B illustrate waveforms of voltages $E_c$ and $E_i$ across the converter 10-side capacitor $C_c$ and the inverter 20-side capacitor $C_i$, as well as of the current $I_{ci}$ through the DC coupling unit 30. FIG. 4A illustrates a case where $E_c$ (as indicated by a solid line) and $E_i$ (as indicated by a broken line) are substantially opposite in phase. FIG. 4B illustrates a case where $E_c$ and $E_i$ are substantially in phase. In any case, voltages $E_c$ and $E_i$ are pulsating, where a difference between voltage ripples is applied to the inductance $L_{ci}$ of the DC coupling unit 30, and the resulting current $I_{ci}$ flows.

In FIG. 4A, a voltage difference in the voltage ripple between $E_c$ and $E_i$, which are substantially opposite in phase, is increased in accordance with an increasing amplitude of each voltage. Thus, during such a period in which the above difference is increased, $I_{ci}$ flowing into the inductance $L_{ci}$ has an increased current ripple. In contrast, in FIG. 4B, because the voltage ripples, as indicated by $E_c$ and $E_i$, are substantially in phase, the ripples of the difference voltage are reduced, and thus the current ripple, as indicated by $I_{ci}$, is also reduced.

With the above-described arrangement, when the switching operations of the converter 10 and the inverter 20 are controlled such that ripples of the voltages $E_c$ and $E_i$ are substantially in phase as illustrated in FIG. 4B, pulsations in the current $I_{ci}$ flowing into the DC coupling unit 30 can be suppressed.

(2) Second Aspect of the Embodiment

Figure 5:
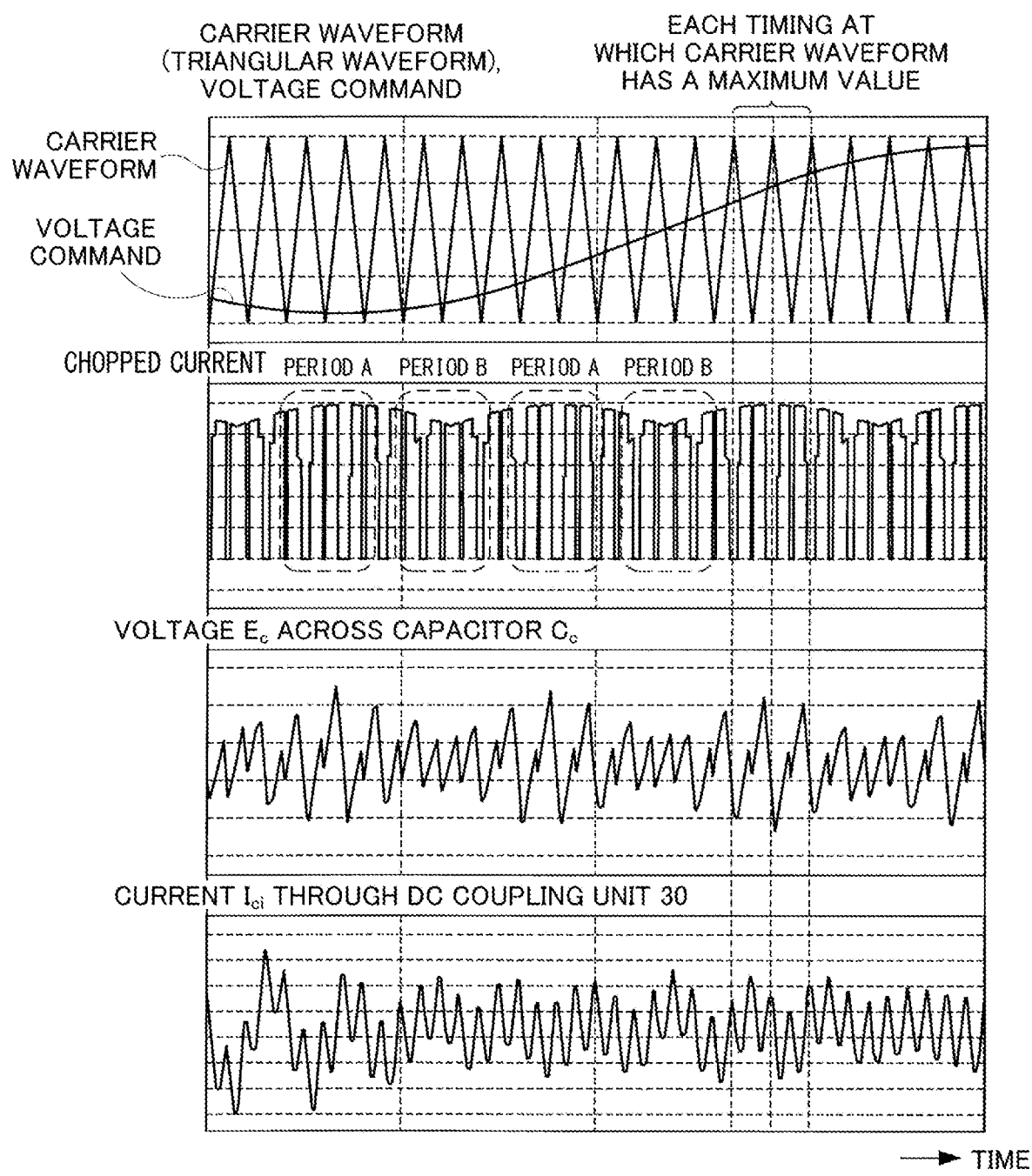
FIG. 5 is a diagram illustrating an operating waveform example on a converter side of the power conversion system illustrated in FIG. 2.

FIG. 5 is an example graph of operating waveforms for the power conversion system illustrated in FIG. 2, and illustrates from top, the carrier waveform (triangular waveform) and the voltage command, the chopped current, the voltage $E_c$ across the converter 10-side capacitor $C_c$, and the current $I_{ci}$ through the DC coupling unit 30.

For the chopped current in FIG. 5, each timing of the carrier waveform of which a value changes to a maximum value is indicated by an auxiliary line. From this, it can be seen that a given frequency of the voltage ripple at the capacitor $C_c$, due to the chopped current, is dependent on the frequency of the carrier waveform. Particularly, it can be seen that the voltage ripple at the capacitor $C_c$ is increased during a period in which any pulse of the chopped current exists, while being decreased during a period (period in which the chopped current is zero) in which no pulse of the chopped current exists. This can be understood from the fact that the chopped current flows into the capacitor $C_c$. On the inverter 20-side not illustrated, the voltage $E_i$ across the capacitor $C_i$ is decreased during a period in which any pulse of the chopped current exists, while being increased during a period in which no pulse exists.

Generally, in PWM converters or PWM inverters, PWM pulses are generated by comparing the carrier waveform, as represented by a triangular waveform, against the voltage command. In this case, as is well known, the current flowing between a power conversion unit for each of the converter and the inverter and a corresponding capacitor of the DC voltage unit becomes a pulsed, chopped current, and main frequency components of the chopped current become components each of which is an integer multiple of the frequency of the carrier waveform. With this arrangement, frequency components of the voltage ripple at the capacitor include a fundamental frequency component, its harmonic components, and multiple components of a sideband in the carrier waveform.

With this arrangement, as described above, a given current ripple through the DC coupling unit 30 is determined by the difference between corresponding voltage ripples at the capacitors $C_c$ and $C_i$. In order to reduce the given current ripple, it is effective to set the corresponding voltage ripples at the capacitors $C_c$ and $C_i$ to be substantially in phase. In light of this point, when the PWM pulse to be applied to each of the converter 10 and the inverter 20 is generated by comparing the voltage command against a corresponding carrier waveform, it is desirable that frequencies of corresponding carrier waveforms used for the converter 10 and the inverter 20 are the same and that a phase relationship between the corresponding carrier waveforms is adjusted such that the voltage ripples at the capacitors $C_c$ and $C_i$ are substantially in phase.

If the frequencies of two carrier waveforms are not the same, the voltage ripples at the capacitors $C_c$ and $C_i$ will go out of phase over time. Also, if a predetermined phase relationship between the two carrier waveforms cannot be maintained, the current ripple through the DC coupling unit 30 would not be suppressed.

(3) Third Aspect and Fourth Aspect of the

A third aspect and fourth aspect of the embodiment will be described below using a specific approach to reduce the current ripple through the DC coupling unit 30.

In general, in each of a PWM converter and a PWM inverter, while in a steady state, an amplitude of the voltage ripple at a corresponding capacitor, among the capacitors $C_c$ and $C_i$, periodically varies to be twice the number of phases for the fundamental wave of the AC side. With this arrangement, in order to align a converter 10-side timing and corresponding inverter 20-side timing at which respective voltage ripples at capacitors $C_c$ and $C_i$ are increased, it is necessary to match the number of phases for each of the converter 10 and the inverter 20. In other words, it is necessary to match the number of phases for each of the AC power supply G and the AC motor M.

A typical case for three phases will be described below.

Hereinafter, the relationship of amplitudes of the voltage ripples at the capacitors Cc and Ci, with the phase of the fundamental wave of the AC-side voltage of each of the converter 10 and the inverter 20, will be described.

The voltage command, as illustrated in FIG. 5 above, corresponds to the fundamental wave of the voltage of any one phase. The voltage command is compared against the carrier waveform to generate the PWM pulse with which a corresponding voltage is to be output to the AC side of each of the converter 10 and the inverter 20. With this arrangement, the resulting chopped current has a pulsed waveform, of which the magnitude is zero during a period (which is referred to as a zero-phase period) in which switching elements of all upper arms or all lower arms of three phases are on; and otherwise the magnitude is the same as a magnitude of the current of any of the AC-side phases during the period.

In FIG. 5, for the chopped current, during a period in which the amplitude of the voltage command (fundamental wave) is less than the amplitude of the carrier waveform, the chopped current has two pulses per one period of the carrier waveform. Looking at a time interval between pulses of the chopped current, it is observed that adjacent pulses of the chopped current repeatedly are close to each other and are apart from each other at timings of the voltage command changed to have a corresponding maximum value and a corresponding minimum value. It can be seen that multiple periods (periods A), i.e., three periods in this case, during each of which closeness and apartness are repeated are present within a half period of the voltage command. Also, it can be seen that a number of times that periods (periods B), during each of which adjacent pulses of the chopped current are substantially uniformly disposed, are present between a certain period A and a subsequent period A, where the number of periods is the same as the number of periods A.

The reason for the observed effects will be briefly described below.

When the voltage command (fundamental wave) is a three phase balanced sinusoidal wave, at each timing of the amplitude of one phase among three phases being maximum, the amplitude of each of voltage commands (not illustrated in FIG. 5) of other two phases is set to be a value that is of inverse sign and half amplitude of the one phase. At such each timing of the amplitude of one phase, when the voltage command of each of the three phases is compared against a common carrier waveform, a given zero-phase period is shorter at a timing of the corresponding carrier waveform being in proximity to a peak, while being longer at a timing of the corresponding carrier waveform being in proximity to a valley. That is, adjacent pulses of the chopped current are close to each other in proximity to a timing of each peak of the carrier waveform, while apart from each other in proximity to a timing of each valley of the carrier waveform.

Such a phenomenon is repeated every time the maximum value and the minimum value for the three phase voltage command (fundamental wave of the voltage) are alternately indicated in positive and negative directions.

The magnitude of the voltage ripple at each of the capacitors $C_c$ and $C_i$ is directly influenced by a pulse position of the chopped current. That is, for the converter 10, if adjacent pulses of the chopped current are close, the voltage across the capacitor $C_c$ is significantly increased because the current frequently flows into the capacitor $C_c$. Also, if adjacent pulses of the chopped current are apart, the voltage across the capacitor $C_c$ is significantly decreased, because no current flows into the capacitor $C_c$ during the zero-phase period, and thus the current flows into the inverter 20-side. In contrast, on the inverter 20-side, if adjacent pulses of the chopped current are close, the voltage across the capacitor $C_i$ is significantly decreased, and if adjacent pulses of the chopped current are apart, the voltage across the capacitor $C_i$ is significantly increased.

The above situation is confirmed with reference with FIG. 5. That is, although partially overlapping with the above description, it is as follows.

Three periods A during each of which pulses of the chopped current are repeatedly close to each other and apart from each other are present within a half period of the three phase voltage command (fundamental wave of the voltage), and the period B during which pulses of the chopped current are substantially uniformly disposed is present between periods A.

During the period A, the amplitude of the voltage ripple at the capacitor $C_c$ is increased.

The voltage across the converter 10-side capacitor $C_c$ is significantly increased during a period in which pulses of the chopped current are close, while being significantly decreased during a period in which pulses are apart.

As described above, when the corresponding voltage ripples at the capacitor C. of the converter 10 and the capacitor $C_i$ of the inverter 20 are set to be in phase during each period in which the voltage ripples are increased, it is effective to reduce the current ripple through the DC coupling unit 30. In view of the above point, first, in order to align periods during which the corresponding voltage ripples at the capacitor $C_c$ of the converter 10 and the capacitor $C_i$ of the inverter 20 are increased, voltage commands of any one AC-side phase for the converter 10 and the inverter 20, that is, frequencies of the voltage fundamental waves are set to be the same and in phase. This is because the magnitude of the voltage ripple at each of the capacitors $C_c$ and $C_i$ is directly influenced by pulses of the chopped current that are close and apart, and further, in the PWM control that uses the carrier for comparison, the converging and diverging of the pulses in the chopped current are determined based on the phase of a corresponding voltage command.

In addition, in order to set the voltage ripples at the capacitors $C_c$ and $C_i$ to be in phase during each period in which the voltage ripples in the capacitors $C_c$ and $C_i$ are increased, it is sufficient when frequencies of corresponding carrier waveforms used for the converter 10 and the inverter 20 are set to be the same and opposite in phase. That is, as described above, the voltage across the capacitor $C_c$ and the voltage across the capacitor $C_i$ are increased and decreased in an opposite relationship, in response to corresponding pulses, of the chopped current, that are close and apart. With this arrangement, in order to align corresponding relationships between the increasing and decreasing of the voltages across the capacitors $C_c$ and $C_i$, it is sufficient when pulses of the chopped current are close and apart in an opposite relationship.

Figure 6A:
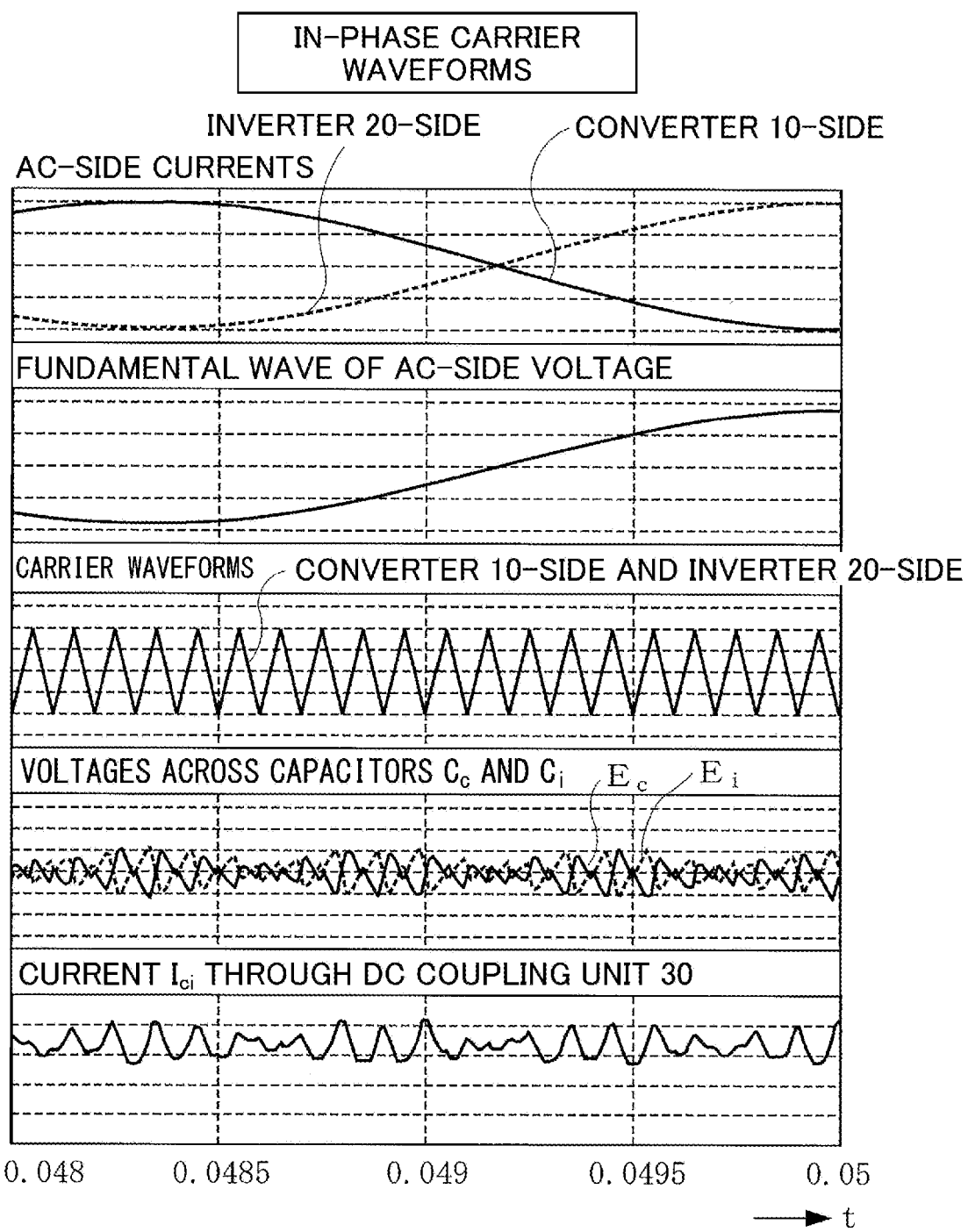
FIG. 6A is a waveform diagram illustrating AC-side currents, a fundamental wave of each AC-side voltage, carrier waveforms, voltages across capacitors, and the current through the DC coupling unit, in a case where the converter-side carrier waveform and an inverter-side carrier waveform are in phase.
Figure 6B:
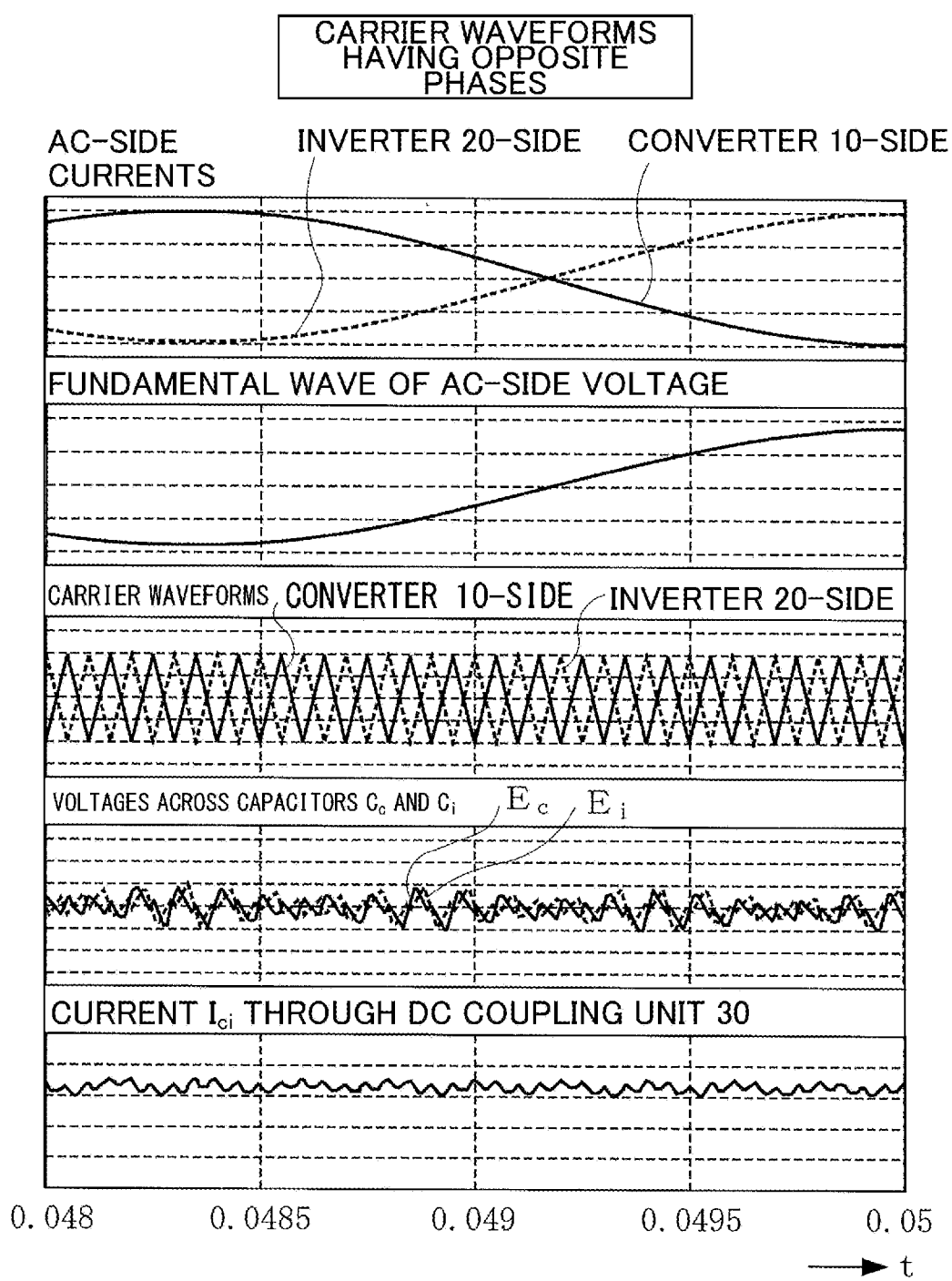
FIG. 6B is a waveform diagram illustrating the AC-side currents, the fundamental wave of each AC-side voltage, the carrier waveforms, the voltages across the capacitors, and the current through the DC coupling unit, in a case where the converter-side carrier waveform and the inverter-side carrier waveform are opposite in phase.

These are illustrated in FIG. 6A. FIG. 6A illustrates a case where corresponding carrier waveforms used for the converter 10 and the inverter 20 are in phase. FIG. 6B illustrates a case where the corresponding carrier waveforms are opposite in phase. In each of FIGS. 6A and 6B, AC-side currents of the converter 10 and inverter 20, a fundamental wave of each AC-side voltage, carrier waveforms, voltages $E_c$ and $E_i$ across the capacitors $C_c$ and $C_i$, and the current $I_{ci}$ through the DC coupling unit 30 are illustrated from the top. Scales of graphs are the same in FIGS. 6A and 6B.

In FIGS. 6A and 6B, because the fundamental waves of the AC-side voltages are in phase, these waveforms overlap with each other. As an example, the AC-side current of the inverter 20 is in phase with the fundamental wave of the voltage, that is, a power factor is 1. As clearly seen from these figures, corresponding periods in which the amplitudes of the voltage ripples at the capacitors are increased simultaneously appear for the converter 10 and the inverter 20. However, in a case where the carrier waveforms are in phase as illustrated in FIG. 6A, the voltages $E_c$ and $E_i$ are substantially opposite in phase. In contrast, in a case where the carrier waveforms are opposite in phase as illustrated in FIG. 6B, the voltages $E_c$ and $E_i$ are substantially in phase. With this arrangement, it can be seen that in FIG. 6B, pulsations in the current $I_{ci}$ can be suppressed in comparison to a case illustrated in FIG. 6A.

As an analogy to the above description, similar effects can be obtained even under a condition in which corresponding fundamental waves of the voltages of any one AC-side phase of the converter 10 and the inverter 20 are set to be at the same frequency and opposite in phase, in conjunction with a condition in which corresponding carrier waveforms used for the converter 10 and the inverter 20 are set to be at the same frequency and in phase.

Figure 7A:
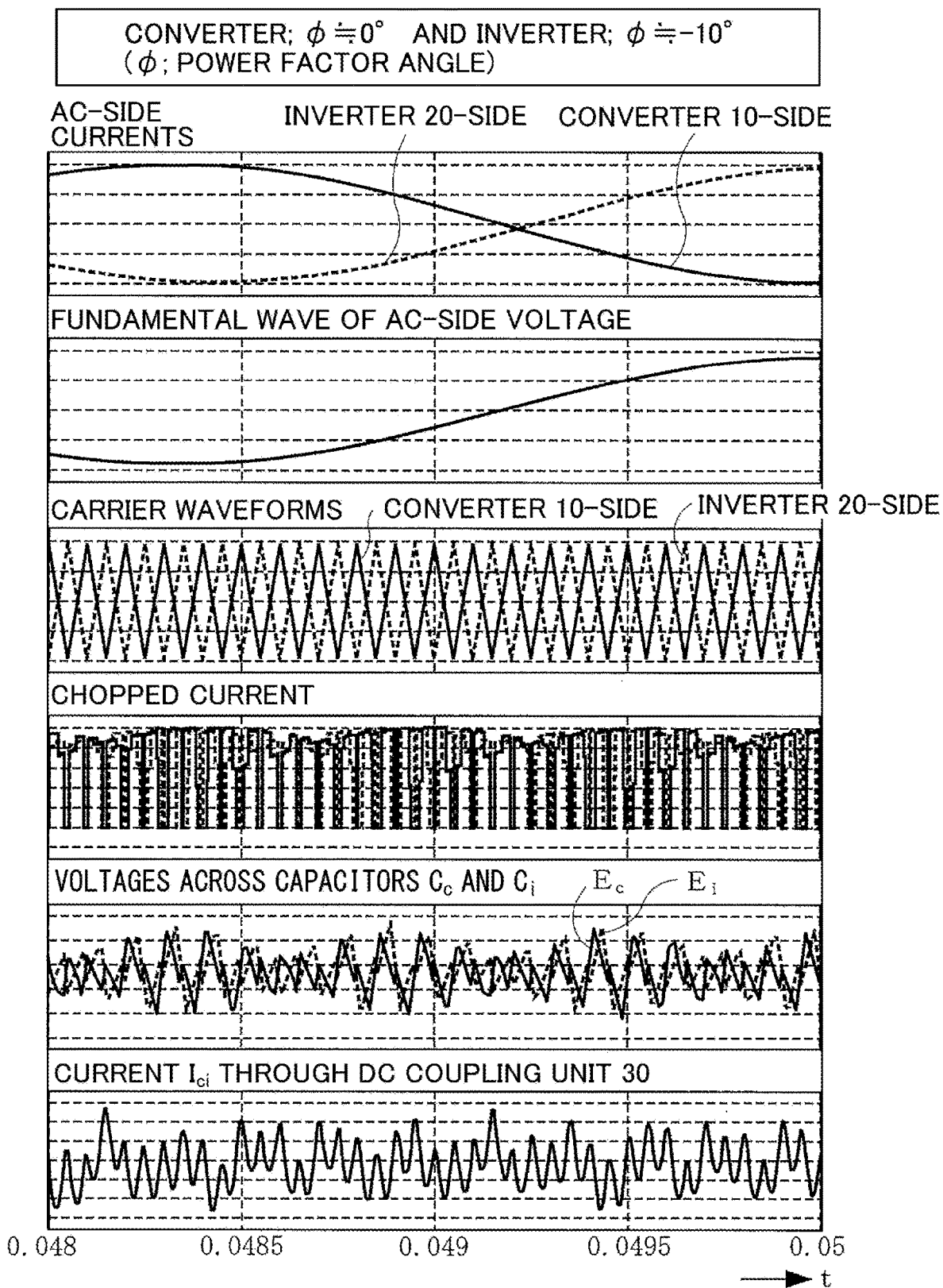
FIG. 7A is a waveform diagram illustrating the AC-side currents, the fundamental wave of each AC-side voltage, the carrier waveforms, a chopped current, the voltages across capacitors, and the current through the DC coupling unit, in a case where a converter-side power factor and an inverter-side power factor differ from each other.
Figure 7B:
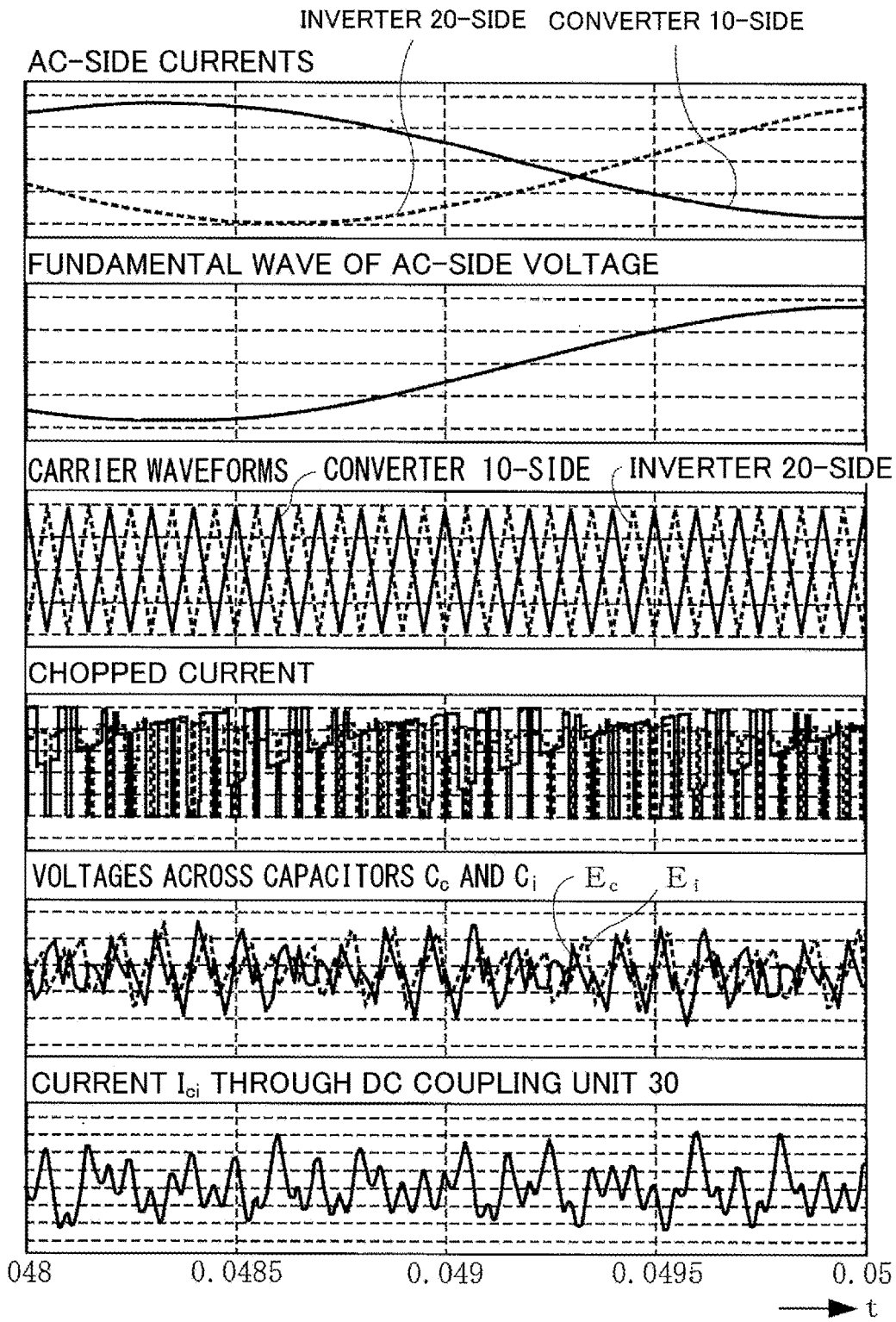
FIG. 7B is a waveform diagram illustrating the AC-side currents, the fundamental wave of each AC-side voltage, the carrier waveforms, the chopped current, the voltages across the capacitors, and the current through the DC coupling unit, in the case where the converter-side power factor and the inverter-side power factor differ from each other.

FIG. 7A is a waveform diagram illustrating the AC-side currents, the fundamental wave of each AC-side voltage, carrier waveforms, the chopped current, the voltages across the capacitors, and the current through the DC-coupling unit, in a case where a power factor angle φ on a converter 10-side is substantially 0° (power factor is substantially 1) and a power factor angle φ on an inverter 20-side is −10° (lagged phase of the current). FIG. 7B is a waveform diagram illustrating the AC-side currents, the fundamental wave of each AC-side voltage, the carrier waveforms, the chopped current, the voltages across the capacitor, and the current through the DC coupling portion, in a case where a power factor angle φ on the converter 10-side is substantially 0° (power factor is substantially 1) and a power factor angle φ on the inverter 20-side is −30° (lagged phase of the current). The corresponding fundamental waves of the voltages across the converter 10 and the inverter 20 are in phase, and the corresponding carrier waveforms used on the converter 10-side and the inverter 20-side are opposite in phase. The chopped current waveform as indicated by a solid line is used on the converter 10-side, and the chopped current waveform as indicated by a broken line is used on the inverter 20-side.

With this arrangement, even when phases of the corresponding currents through the converter 10 and the inverter 20 differ from each other, the converging and diverging of pulses of the chopped current, as described above, are determined based on only the phase of a corresponding fundamental wave of the voltage, without limitations to any power factor. In this case, it can be seen that a pattern in which the amplitude of the voltage ripple at each of the capacitors $C_c$ and $C_i$ changes repeatedly is substantially the same, thereby obtaining similar effects.

(4) Fifth Aspect of the Embodiment

The present disclosure is applicable to a case where at least one of the converter or the inverter is constituted by a plurality of power conversion units in each of which DC voltage units are coupled in parallel. As an example, another embodiment of the present disclosure is described using FIG. 8.

Figure 8:
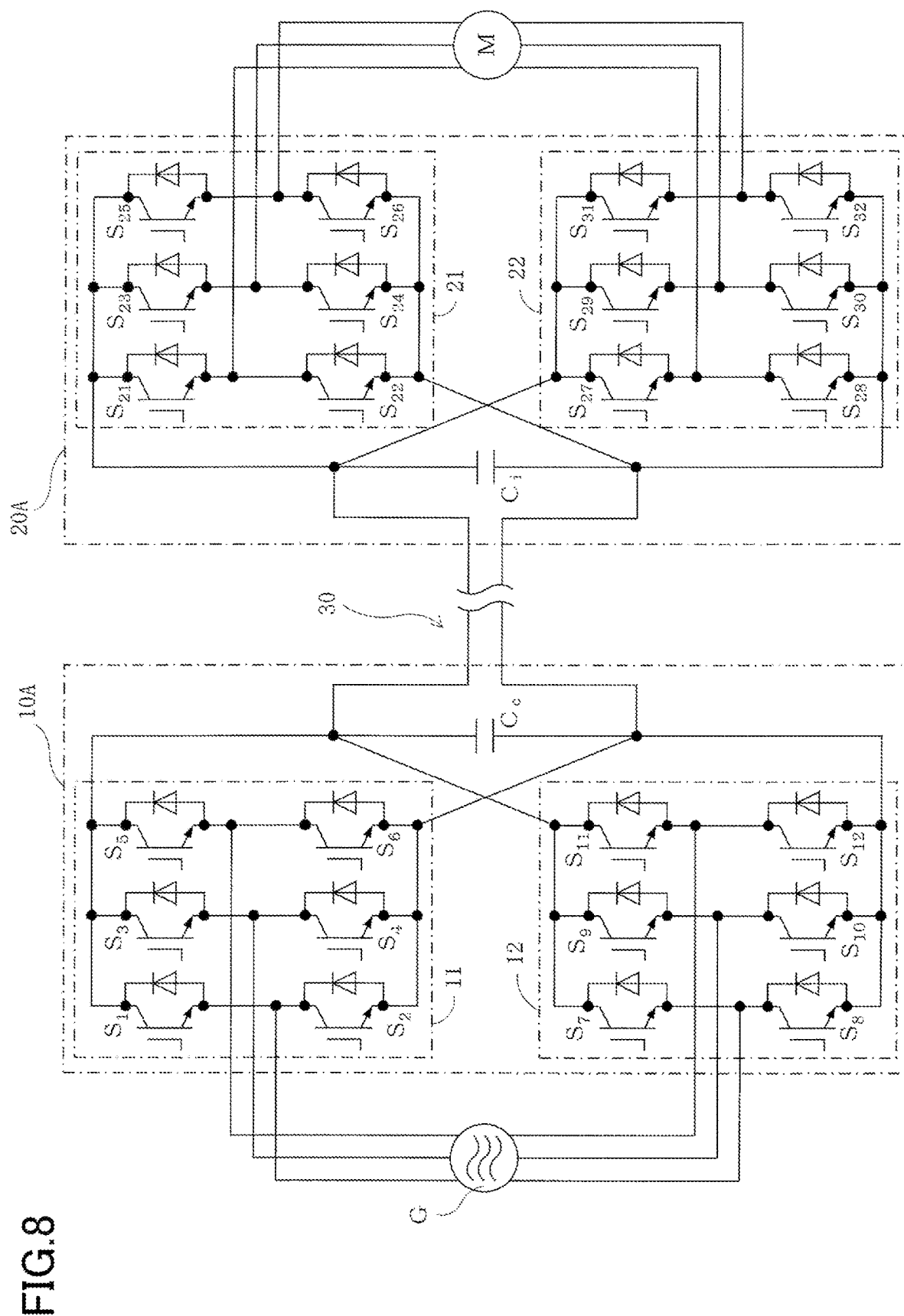
FIG. 8 is a diagram illustrating the main circuit of the power conversion system according to another embodiment of the present disclosure.

In a case in FIG. 8, a converter 10A is constituted by two power conversion units 11 and 12 coupled in parallel, an inverter 20A is constituted by two power conversion units 21 and 22 coupled in parallel, one AC power supply G is coupled to the converter 10A, and one AC motor M is coupled to the inverter 20A. All of switching frequencies of the power conversion units 11 and 12 and power conversion units 21 and 22 are the same.

In the present embodiment, as in the above-mentioned embodiments, the current ripple through the DC coupling unit 30 can be suppressed by controlling the power conversion units 11 and 12 and the power conversion units 21 and 22 such that predetermined components of corresponding voltage ripples at the capacitors $C_c$ and $C_i$ are substantially in phase.

(5) Sixth Aspect and Seventh Aspect of the Embodiment

In the configuration in FIG. 8, the voltage ripple at the capacitor $C_c$ of the converter 10A is caused by interaction between the power conversion units 11 and 12 coupled in parallel, and the voltage ripple at the capacitor $C_i$ of the inverter 20A is caused by interaction between the power conversion units 21 and 22 coupled in parallel.

With this arrangement, by staggering PWM pulses that are applied to the power conversion units 11 and 12 in the converter 10A, the resulting corresponding timings of pulses that are generated in DC bus currents (chopped currents) are staggered. Likewise, by staggering PWM pulses that are applied to the power conversion units 21 and 22 in the converter 20A, the resulting corresponding timings of pulses that are generated in DC bus currents (chopped currents) are staggered. Thus, the voltage ripple at each of the capacitor $C_c$ and the capacitor $C_i$ can be suppressed.

For example, when the PWM pulses that are applied to the respective power conversion units 11 and 12 in the converter 10A are staggered so as to be substantially uniformly distributed, the resulting corresponding timings of pulses that are generated in the DC bus currents that flow from the power conversion units 11 and 12 can be staggered to be substantially uniformly distributed. As a result, a total sum of currents flowing into the capacitor $C_c$ is smoothed, and thus the voltage ripple at the capacitor $C_c$ can be suitably suppressed. In a case where two power conversion units are coupled in parallel, it is sufficient when their corresponding PWM pulses are substantially alternately applied. The staggering of the PWM pulses that are applied to the respective power conversion units is likewise applied to a case of the power conversion units 21 and 22 of the inverter 20A.

According to the present embodiment, it will be obvious that the current ripple through the DC coupling unit 30 can be also reduced as in the above-described embodiments.

(6) Eighth Aspect of the Embodiment

In the configuration in FIG. 8, desirably, switching frequency components of corresponding voltage ripples at the capacitors $C_c$ of the converter 10A and the capacitor $C_i$ of the inverter 20A are substantially in phase, and harmonic components of the switching frequencies are canceled by staggering the resulting timings of pulses that are generated in the DC bus currents in the power conversion units 11 and 12, as well as the power conversion units 21 and 22.

In light of the fact that the converter 10A and the inverter 20A are physically separated from each other to some extent, there are inevitable variations in the phase of each of the carrier waveforms that are adjusted, and effects of the variations are increased in accordance with an increasing radio frequency wave component. With this arrangement, for a given switching frequency component that is at the lowest frequency among current ripple components, through the DC coupling unit 30, that are caused by switching operations of the converter 10A and the inverter 20A, the given switching frequency component is suppressed by adjusting the phases of the carrier waveforms that are used for the converter 10A and the inverter 20A, thereby reducing the above effects of the variations during adjustment.

In contrast, as in a case of the power conversion units 21 and 22 coupled in parallel, because it is assumed that the power conversion units 11 and 12 coupled in parallel are disposed physically close to each other (for example, within the same housing), phases of the corresponding carrier waveforms can be adjusted with high accuracy in comparison to a case of the converter 10A and the inverter 20A. In this case, it is sufficient when harmonic components of a given switching frequency are suppressed by interaction between a corresponding plurality of power conversion units coupled in parallel.

It is considered that a cable or the like that constitutes the DC coupling unit 30 exhibits distributed-constant behavior. Such behavior is exhibited significantly, for example, in accordance with an increasing cable length or a decreasing distance between positive and negative conductors.

In general, the distributed-constant behavior is exhibited significantly in accordance with increasing frequency. With this arrangement, when a fluctuation of the high frequency voltage is applied to both ends of the cable or the like, even if cancelation of fluctuation is attempted by adjusting phases at the respective ends of the cable, the resulting radio frequency current flows through a distributed-constant element such as a cable, that is, a capacitance component between positive and negative conductors. With this arrangement, harmonic components of the switching frequencies at the respective ends of the cable are cancelled by interaction between the power conversion units 11 and 12, as well as interaction between the power conversion units 21 and 22, and further the resulting switching frequency components relating to a relatively low frequency are reduced by adjusting the phases at the respective ends of the cable. Thus, effects of the distributed-constant behavior that is exhibited by the cable are less likely to be suffered, thereby allowing the current ripple to be suppressed suitably.

(7) Ninth Aspect of the Embodiment

Unlike in the eighth aspect of the embodiment, switching frequency components of the corresponding voltage ripples at the capacitor $C_c$ of the converter 10A and the capacitor $C_i$ of the inverter 20A may be canceled by staggering timings of the pulses that are generated in the DC bus currents of the power conversion units 11 and 12 and the power conversion units 21 and 22. Also, harmonic components of the switching frequencies may be set to be substantially in phase in the converter 10A and the inverter 20A.

That is, for a given switching frequency component that normally has the greatest component percentage and is of a current ripple generated at the DC coupling unit 30 such as a cable, pulsatile components are fundamentally reduced by staggering respective timings, at both ends of the DC coupling unit 30, of pulses that are generated in DC bus currents in the power conversion units 11 and 12, and by staggering respective timings, at both ends of the DC coupling unit 30, of pulses that are generated in DC bus currents in the power conversion units 21 and 22. Both ends of the DC coupling unit 30 are, for example, in corresponding interiors of the converter 10A and the inverter 20A. In addition, the remaining harmonic components of the switching frequencies of the current ripple that is generated at the DC coupling unit 30 are canceled by interaction between the converter 10A and the inverter 20A. That is, predetermined components of the corresponding voltage ripples at the capacitors $C_c$ and $C_i$ are set to be in phase.

(8) Tenth Aspect of the Embodiment

In the present embodiment, a case where each of the converter 10A and the inverter 20A is constituted by a plurality of power conversion units coupled in parallel is further specified.

As in a case where one power conversion unit is used, when the PWM pulse is generated by comparing the voltage command against the carrier waveform, the carrier waveform that is used for each of the plurality of power conversion units coupled in parallel is set to have the same frequency, and a predetermined phase difference is provided between respective carrier waveforms for the plurality of power conversion units. With this arrangement, respective timings of pulses that are generated in chopped currents output from the power conversion units can be easily staggered. This can be easily understood from the description and the like that are provided with reference to FIG. 5.

As an example, it is considered that when two power conversion units are coupled in parallel, carrier waveforms provided to the respective power conversion units are inverted. Also, it is considered that when three power conversion units are used, given carrier waveforms are uniformly 120° out of phase. In any case, because a given pulse timing of the chopped current that is generated through each of the power conversion units is uniformly offset from any other one or two pulse timings for the remaining one or more power conversion units, voltage ripples at the capacitors $C_c$ and $C_i$ can be reduced, thereby reducing the resulting current ripple through the DC coupling unit 30. Alternatively, it is effective to shift phases of carrier waveforms so as to cancel the harmonic components of the switching frequencies.

Also, as in a case of one power conversion unit, when a plurality of power conversion units are used, carrier waveforms used for the converter 10A and the inverter 20A are set to have the same frequency, and further a phase relationship between a converter 10-side carrier waveform and an inverter 20-side carrier waveform is adjusted. Thus, main components of the voltage ripples at the capacitors $C_c$ and $C_i$ are substantially in phase, and thus able to suppress the current ripple through the DC coupling unit 30.

(9) Eleventh Aspect of the Embodiment

As illustrated in FIG. 8, when each of the converter 10A and the inverter 20A includes a plurality of power conversion units coupled in parallel, in a case where frequencies of the fundamental waves of the AC-side voltages of the converter 10A and the inverter 20A are set to be the same, respective change timings of amplitudes of the voltage ripples at the capacitors $C_c$ and $C_i$ can be aligned. In addition, for each of a plurality of power conversion units that are coupled in parallel, by setting the amplitude of the fundamental wave for each of a corresponding AC-side voltage and AC-side current to be substantially the same, the resulting chopped currents that are generated by the respective power conversion units become similar waveforms. Thus, by providing a phase difference between the chopped currents, the resulting current ripples can be suitably canceled.

Figure 9A:
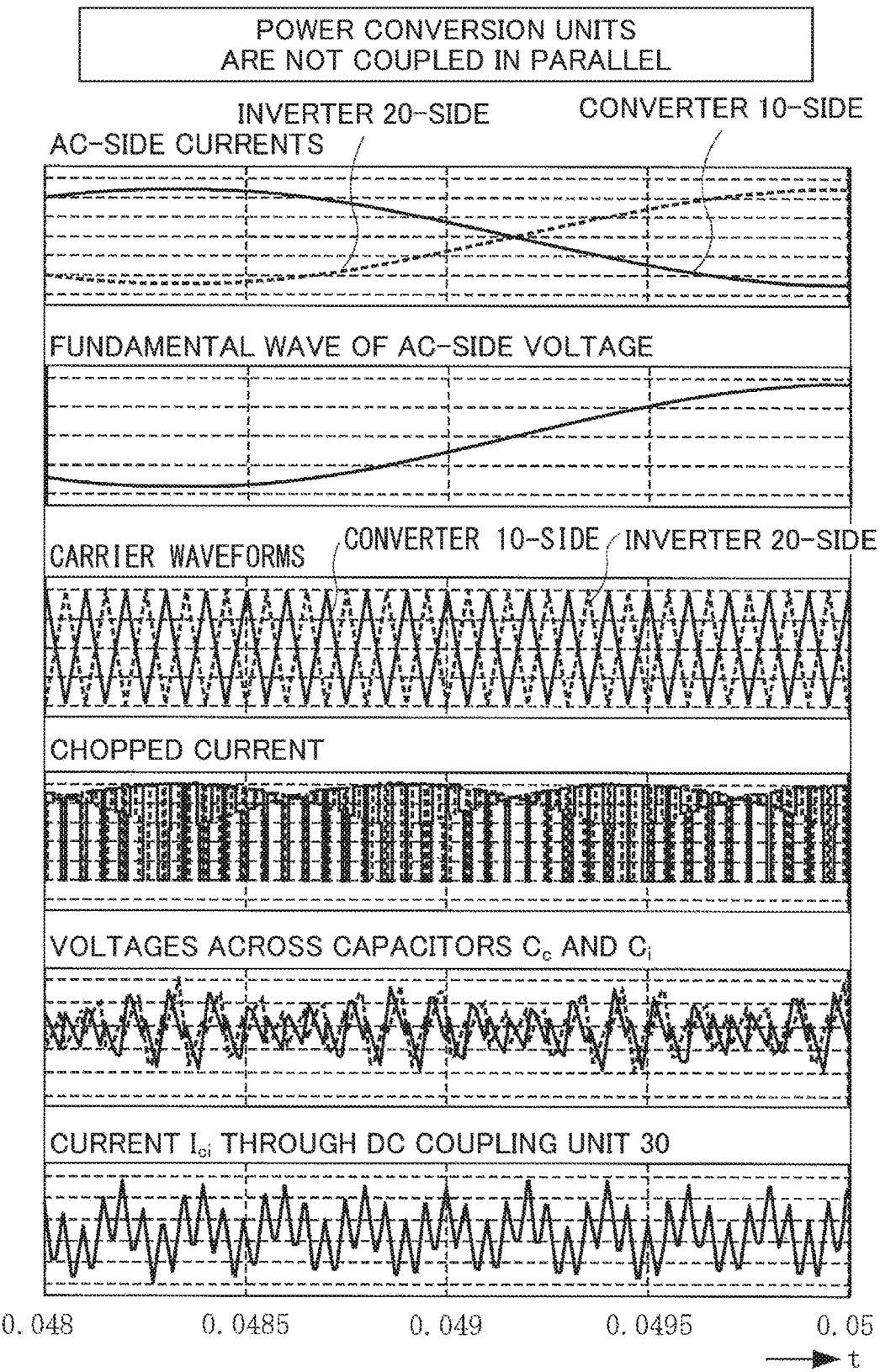
FIG. 9A is a waveform diagram illustrating the AC-side currents, the fundamental wave of each AC-side voltage, the carrier waveforms, the chopped current, the voltages across the capacitors, and the current through the DC coupling unit, in a case where each of the converter and the inverter includes one power conversion unit.
Figure 9B:
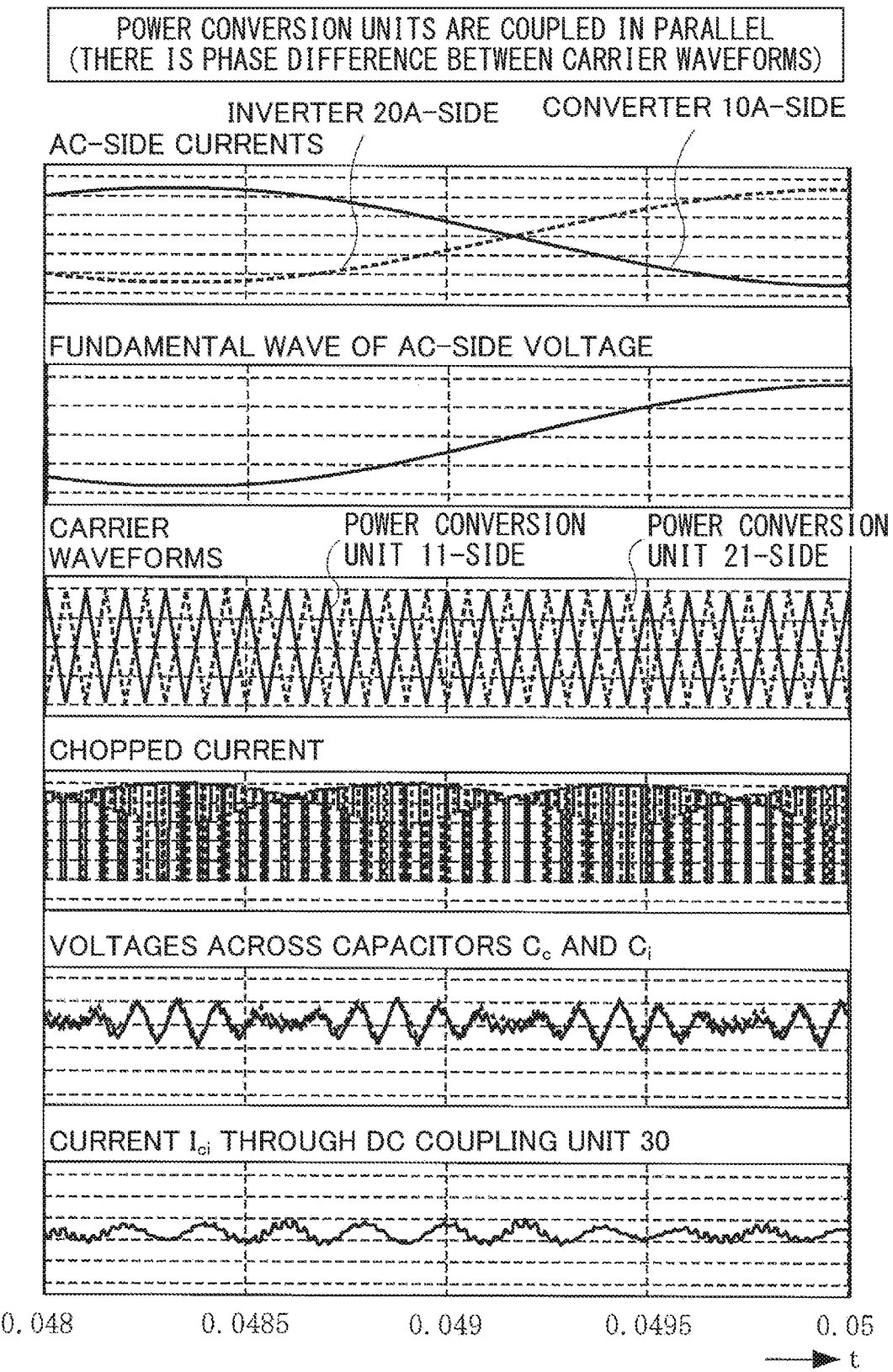
FIG. 9B is a waveform diagram illustrating the AC-side currents, the fundamental wave of each AC-side voltage, the carrier waveforms, the chopped current, the voltages across the capacitors, and the current through the DC coupling unit, in a case where each of the converter and the inverter includes a plurality of power conversion units coupled in parallel.

FIGS. 9A and 9B are waveform diagrams illustrating simulation results according to the present embodiment.

FIG. 9A used for comparison is a waveform diagram illustrating the AC-side currents, the fundamental wave of each AC-side voltage, the carrier waveforms, the chopped currents, the voltages across the capacitors, and current through the DC coupling unit, in a case where each of the converter 10 and the inverter 20 includes one power conversion unit. In FIG. 9A, a converter 10-side carrier and an inverter 20-side carrier are opposite in phase, which corresponds to the above example in FIG. 6B.

In contrast, as in FIG. 8, FIG. 9B is a diagram illustrating waveforms at each component in a case where the converter 10A includes the power conversion units 11 and 12 coupled in parallel and the inverter 20A includes the power conversion units 21 and 22 coupled in parallel. FIG. 9B illustrates a case where fundamental waves of the AC-side voltages of the converter 10A and the inverter 20A are in phase and the amplitude for each of the AC-side current and the fundamental wave of the AC-side voltage is substantially the same for each of a pair of the power conversion units 11 and 21 and another pair of the power conversion units 12 and 22. In addition, FIG. 9B illustrates a case where for four power conversion units 11, 12, 21, and 22, their corresponding carrier waveforms have the same frequency and respective phases of the carrier waveforms are set to 0°, 90°, 180°, and 270°. That is, for the converter 10A, carrier waveforms for the power conversion units 11 and 12 are 90° out of phase, and for the inverter 20A, carrier waveforms for the power conversion units 21 and 22 are 90° out of phase. As a result, corresponding carrier waveforms for the converter 10A and the inverter 20A are 180° out of phase in total. In FIG. 9B, only the carrier waveform for the power conversion unit 11 of the converter 10A and the carrier waveform (these carrier waveforms are 180° out of phase) for the power conversion unit 21 of the inverter 20A are illustrated, and other carrier waveforms for the remaining power conversion units 12 and 22 are omitted.

For the chopped currents in FIG. 9B, the solid line indicates the chopped current used on a power conversion unit 11-side of the converter 10A, and a broken line indicates the chopped current used on a power conversion unit 21-side of the inverter 20. A voltage $E_c$ across the capacitor $C_c$ is indicated by a solid line, and a voltage $E_i$ across the capacitor $C_i$ is indicated by a broken line.

In each of FIGS. 9A and 9B, the scale for a corresponding waveform is the same.

According to the present embodiment (FIG. 9B), in the converter 10A and the inverter 20A, their corresponding frequency components of the carrier waveforms, which are main components of the current ripple through the DC coupling unit 30, are set to be in phase to cancel the frequencies components. In addition to the cancellation, for each pair of the power conversion units 11 and 12 of the converter 10 and another pair of the power conversion units 21 and 22 of the inverter 20, frequency components, each of which is twice the frequency of the carrier waveform, are set to be in phase to cancel these frequency components. As a result, it can be seen that the current ripple through the DC coupling unit 30 is further reduced as compared to a case in FIG. 9A.

Figure 10:
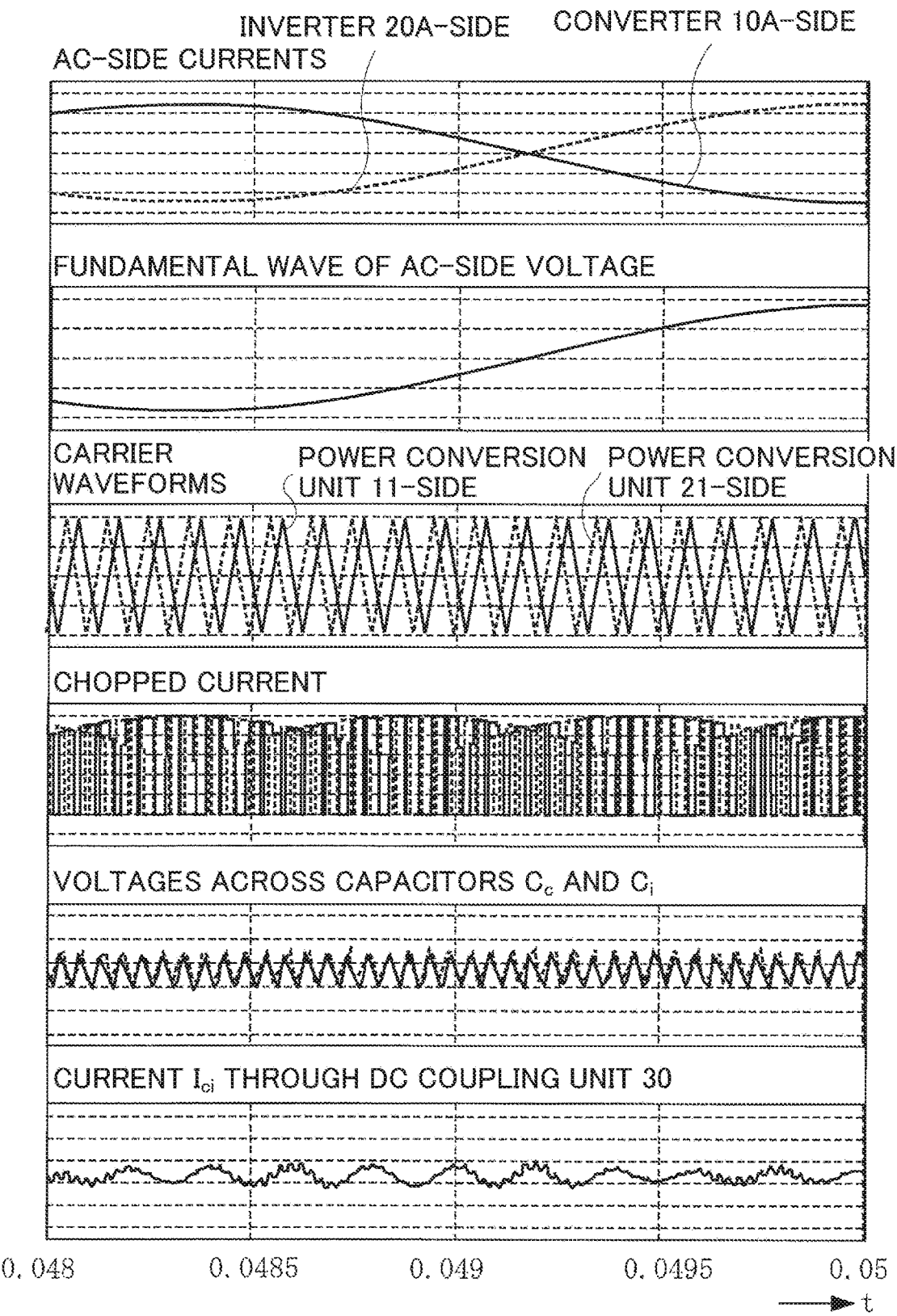
FIG. 10 is a waveform diagram illustrating the AC-side currents, the fundamental wave of each AC-side voltage, the carrier waveforms, the chopped current, the voltages across the capacitors, and the current through the DC coupling unit, in a case where each of the converter and the inverter includes the plurality of power conversion units coupled in parallel.

Unlike in FIG. 9B, FIG. 10 is a waveform diagram in a case where in each of the converter 10A and the inverter 20A, frequency components that are each twice the frequency of a corresponding carrier waveform are canceled. In FIG. 10, for each of a pair of the power conversion units 11 and 12 of the converter 10A and another pair of the power conversion units 21 and 22 of the inverter 20A, frequency components of corresponding carrier waveforms are canceled.

In this example, carrier waveforms for four power conversion units 11, 12, 21, and 22 are set to have the same frequency, and phases of the carrier waveforms are set to 0°, 180°, 90°, and 270°, respectively. In FIG. 10, only the carrier waveform for the power conversion unit 11 of the converter 10A and the carrier waveform (these carrier waveforms are 90° out of phase) for the power conversion unit 21 of the inverter 20A are illustrated, and other carrier waveforms for the remaining power conversion units 12 and 22 are omitted. Also, for the chopped currents, the solid line indicates the chopped current obtained on a power conversion unit 11-side of the converter 10A, and a broken line indicates the chopped current obtained on a power conversion unit 21-side of the inverter 20A. A voltage $E_c$ across the capacitor $C_c$ is indicated by a solid line, and a voltage $E_i$ across the capacitor $C_i$ is indicated by a broken line.

As in the case in FIG. 9B, it can be seen in FIG. 10 that the current ripple through the DC coupling unit 30 is reduced.

In comparing FIG. 9B with FIG. 10, it can be seen that frequency components of the voltage ripples at the capacitors $C_c$ and $C_i$ differ from each other. This is because frequency components, which are to be canceled, of respective voltages across the capacitors differ from each other (FIG. 9B uses the frequency component of the carrier waveform, while FIG. 10 uses the frequency component that is twice the frequency component of the carrier waveform), in order to solve the problem in the present disclosure in which voltage ripples at a converter 10A-side capacitor $C_c$ and an inverter 20A-side capacitor $C_i$ are set to be substantially in phase to cancel the voltage ripples, thereby reducing current ripple through the DC coupling unit 30.

(10) Twelfth Aspect of the Embodiment

When each of the converter 10A and the inverter 20A is constituted by a plurality of power conversion units coupled in parallel, even if one power conversion unit stops due to a failure or the like, the system can continue to operate by the remaining power conversion units.

In this case, if the remaining power conversion units operate in the same manner as a case where all power conversion units operate, the suppression, by interaction between individual power conversion units, of the current ripple through the DC coupling unit 30 is not appropriately enabled, and thus the resulting current ripple may be increased.

Therefore, an object of the present embodiment is to ameliorate the above situation by correcting an operation state of the remaining power conversion units.

For example, as illustrated in FIG. 8, in the configuration in which the converter 10A includes two power conversion units 11 and 12 coupled in parallel, and the inverter 20A includes two power conversion units 21 and 22 coupled in parallel, when any one power conversion unit of the converter 10A stops, the operation state may be corrected as follows.

(a) One of two power conversion units 21 and 22 in the inverter 20A is stopped so that a state where one power conversion unit in each of the converter 10A and the inverter 20A operates is maintained. In this state, the current ripple through the DC coupling unit 30 is suppressed based on the operations described above.

(b) Two power conversion units 21 and 22 of the inverter 20A operate as if they were one power conversion unit. That is, a given AC-side voltage, a given AC-side current, and a given carrier waveform are shared to suppress the current ripple through the DC coupling unit 30.

(11) Thirteenth to Fifteenth Aspects of the Embodiment

The present embodiment is directed to a control circuit of the power conversion system and relates to the configuration and operation of the control circuit as illustrated in FIG. 1B above. In the following, a case where the converter 10 and the inverter 20 as illustrated in FIG. 1A are controlled is described. However, a control circuit similar to the above control circuit can be also basically applied to a case of controlling the converter 10A and the inverter 20A each of which includes a plurality of power conversion units coupled in parallel as illustrated in FIG. 8.

As is described later, the configuration of the control circuit in the present disclosure is not limited to the example in FIG. 1B.

In FIG. 1B, power that is obtained by adding both a shaft output, which is obtained by multiplying an angular velocity by torque that the inverter 20 applies to a load (not illustrated) through the AC motor M, and a loss, is power that the converter 10 is to supply to the DC coupling unit 30. In order to satisfy such a relation, it is sufficient when a DC component resulting from a given DC voltage unit that includes the capacitor C. of the converter 10 stays constant. With this arrangement, a control system of the converter 10 provides a feedback control in which a DC voltage of the given DC voltage unit is set to a predetermined magnitude, so that the resulting control amount becomes a power production amount P at the AC power supply G. The power production amount P is adjusted by passing the current that is synchronized with the voltage at the AC power supply G.

In contrast, when a control system of the inverter 20 controls the torque applied by the AC motor M, it is sufficient to control the resulting current. Also, when controlling the speed of the AC motor M, it is sufficient to provide a feedback control for speed to control the torque.

In FIG. 1B, on the converter 10-side, DC voltage regulation is enabled with a current control minor loop, and on the inverter 20-side, (rotational) speed control is enabled with a current control minor loop. These applicable methods are well known and can include direct control relating to alternating current magnitudes, DC regulation enabled through rotation-coordinate transformation, vector control, sensorless vector control, and the like. The description thereof is omitted.

As described in the above embodiments, in order to reduce the current ripple through the DC coupling unit 30, it is effective to set the frequency of the fundamental wave for each of the AC power supply G and the AC motor M to be the same. Therefore, in a control circuit in FIG. 1B, the current frequency of the AC power supply G is provided to the inverter 20 as a magnitude corresponding to a frequency command for the AC motor M.

That is, on the converter 10-side, because current regulation for the AC power supply G is enabled, information on the current frequency of the AC power supply G is stored. In contrast, on the inverter 20-side, the speed of the AC motor M is controlled, and a corresponding speed control command is directly related with the current frequency of the AC motor M. This relation is determined based on a type (synchronous motor, induction motor, or the like) of the AC motor M, the number of poles, and the like. With this arrangement, information on the current frequency that is stored on the converter 10-side is sent to the inverter 20 such that the current frequency of the AC motor M is coincident with the current frequency of the AC power supply G, i.e., such that the converter 10 and the inverter 20 are synchronized with one another. Then, the inverter 20-side generates, for example, a speed command and the like, based on the information.

A specific control method as illustrated in FIG. 1B is as follows. In this description, each of the AC power supply G and the AC motor M is a synchronous motor.

In the case of the synchronous motor, each of the current frequency and rotation frequency for the motor is equal to the multiple (integral multiple) of the number of poles of the motor. With this arrangement, in both the converter 10 and the inverter 20, phase angles $\theta_g$ and $\theta_m$ of synchronous motors that are detected by position sensors $SENS_g$ and $SENS_m$ are converted into electric angles $\theta_{ge}$ and $\theta_{me}$ by electric angle converter $p_g$ and $p_e$, respectively, and then one of the angles $\theta_{ge}$ and $\theta_{me}$ is provided to both a corresponding rotation-coordinate transformer VR and a corresponding inverse transformer VRI in a control system. In a case of sensorless control, as each of $\theta_{ge}$ and $\theta_{me}$, an estimation value that is determined using information of a given voltage and a given current in the control system is used.

Hereinafter, the current control minor loop used for each of the converter 10-side and the inverter 20-side will be described. For the converter 10-side and the inverter 20-side, with use of a given rotation-coordinate transformer VR, an AC current Ig of the AC power supply G is converted into the DC currents $I_{gd}$ and $I_{gq}$, and then a difference between each of the DC currents and a corresponding current command is input to a given current regulator ACR to generate a corresponding DC voltage command. Also, with use of a given rotation-coordinate transformer VR, an AC current $I_m$ of the AC motor M is converted into the DC currents $I_{md}$ and $I_{mq}$, and then a difference between each of the DC currents and a corresponding current command is input to a given current regulator ACR to generate a corresponding DC voltage command. The above DC voltage commands are inversely transformed to AC voltage commands $V_c$ and $V_i$ through inverse transformers VRI, respectively, then the respective AC voltage commands $V_c$ and $V_i$ are compared against carrier waveforms by comparators $COMP_c$ and $COMP_i$ to generate PWM pulses (commands), and finally the PWM pulses are provided to the respective power conversion units 11 and 21. Although frequencies of the corresponding carrier waveforms used for the converter 10 and inverter 20 are the same, the carrier waveforms can have a phase difference by a phase shifter F, as necessary.

Hereinafter, the DC voltage regulation for the converter 10-side will be described.

A voltage $E_c$ across the DC voltage unit of the converter 10 is detected and then a voltage $E_{c\text{-}lpf}$ is generated through a low pass filter LPF. A feedback control system for matching the voltage $E_{c\text{-}lpf}$ to a target value $E_{cref}$ is provided, where a difference between the voltage $E_{c\text{-}lpf}$ and the target value $E_{cref}$ is input to a voltage regulator AVR to obtain a power command. A current command to cause the AC power supply G to output a power production amount corresponding to the power command is generated by a power command transformer (P→I), and then is provided to the above current control minor loop of the converter 10-side.

Hereinafter, the speed control of the inverter 20-side will be described.

The feedback control is enabled such that an electric angular frequency $\omega_{me}$, which is obtained by multiplying a rotational frequency $\omega_m$ of the AC motor M by a number $p_e$ of pole pairs, matches a target value $\omega_{meref}$ that indicates a rotational frequency and is output from a phase locked unit 43 described below. A difference between the electric angular frequency $\omega_{me}$ and the target value $\omega_{meref}$ is input to a speed regulator ASR to obtain a torque command. A current command to cause the AC motor M to generate the torque corresponding to the torque command is generated by a torque command transformer (T→I), and then is provided to the above current control minor loop of the inverter 20-side.

Hereinafter, an approach to match the current frequency of the AC power supply G to the current frequency of the AC motor M will be described.

In FIG. 1B, in addition to the matching of the current frequencies, the phase angle of the current can be also adjusted. This is implemented by a phase locked unit 43. The phase locked unit 43 provides feedback control to adjust a phase angle $\theta_{me}$ of the current through the AC motor M with reference to the phase angle $\theta_{ge}$ of the current through the AC power supply G. That is, a value obtained by adding a predetermined offset angle $\theta_{adf}$ to a difference between $\theta_{ge}$ and $\theta_{me}$ is input to a phase locked loop (PLL), and the output of the PLL is used as the target value $\omega_{meref}$ indicative of the rotational frequency of the AC motor M. That is, $\omega_{meref}$ that is proportional to a rotational speed of the AC motor M is adjusted such that $\theta_{ge}$ and $\theta_{me}$ are coincident.

By the operation of the control circuit described above, corresponding fundamental waves for the AC power supply G and the AC motor M can be synchronized.

Unlike in the above case, the frequency of the current through the AC motor M can be determined in accordance with a loading state of the AC motor M, to thereby match the frequency of the current through the AC power supply G to the frequency of the current through the AC motor M. Specifically, the rotational speed of rotational power that serves as a drive source that is for the AC power supply G can be adjusted so as to match the frequency of the current of the AC power supply G to the frequency of the current of the AC motor M.

Figure 11:
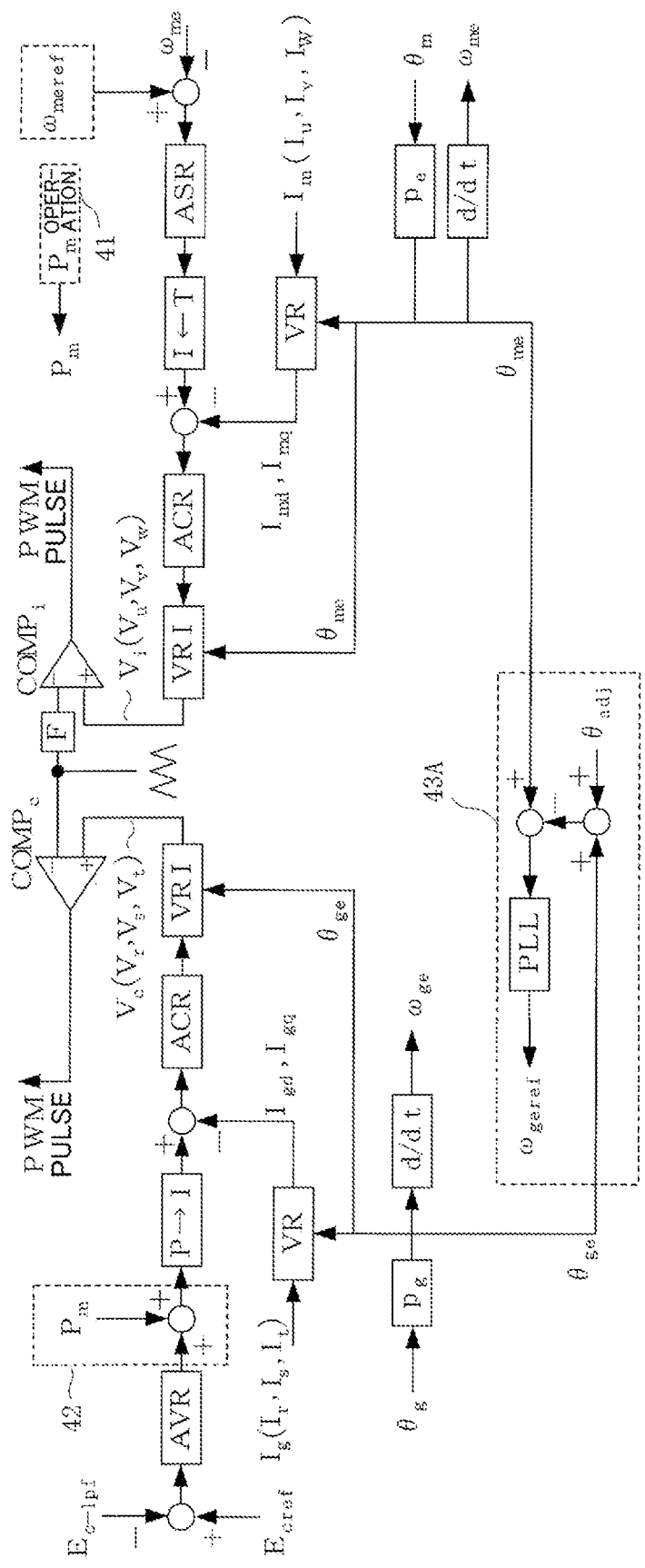
FIG. 11 is a block diagram illustrating a modification of the control circuit in FIG. 1B.

A block diagram of the control circuit used in the above case is illustrated by FIG. 11. In FIG. 11, in order to adjust the phase angle $\theta_{ge}$ of the AC power supply G with reference to the phase angle $\theta_{me}$ of the AC motor M, in the phase locked unit 43A, a given value that is obtained by adding a predetermined offset angle $\theta_{adf}$ to a difference between $\theta_{me}$ and $\theta_{ge}$ is input to the phase locked loop PLL, and the output of the PLL is used as the target value $\omega_{geref}$ of the electric angular frequency of the AC power supply G. That is, $\omega_{meref}$ that is proportional to the rotational speed of the AC motor M is adjusted such that $\theta_{me}$ and $\theta_{ge}$ are coincident. The AC power supply G is driven with an external force not illustrated, e.g., an engine, and $\omega_{geref}$ is provided to a control system, not illustrated, for the external force. Even when such a control circuit is used, the corresponding fundamental waves for the AC power supply G and the AC motor M can be synchronized. In this control system, the target value $\omega_{meref}$ indicative of the electric angular frequency of the AC motor M, is provided in accordance with a condition of the load.

Hereinafter, an approach to stably supply the power from the AC power supply G to the AC motor M to reliably synchronize corresponding fundamental waves at the AC power supply G and the AC motor M will be described. In order to implement the approach, it is effective for the AC power supply G to timely supply the power required for the AC motor M without delay. Such a function is implemented by a motor power calculator 41 and a power feed forward unit (power FF unit) 42.

Power $P_m$ of the AC motor M is defined by a product of output torque and a mechanical angular frequency, and their corresponding torque and frequency commands are known in a given control circuit. With use of these pieces of information, the motor power calculator 41 can determine the power $P_m$ of the AC motor M. The power feed forward unit 42 adds the determined power $P_m$ to a power command for the converter 10, and thus the power required for the AC motor M can be produced by the AC power supply G without delay. Strictly, although the AC power supply G needs to produce power, including power corresponding to losses in the power of the converter 10, the inverter 20, and the AC motor M, the losses are generally small compared to a power production amount, and thus effects of the losses on the control circuit are minimal. Also, reductions by the losses are compensated by a feedback control system. Therefore, there is no issue.

If a feed forward for the power $P_m$ of the AC motor M described above is not enabled, in a case where for example, the power of the AC motor M is rapidly increased, the inverter 20 tries to obtain, from the converter 10, power that exceeds a power production amount that is obtained at that time. In this case, the resulting voltage across a given DC voltage unit is decreased, and thus the power production amount is increased by operations of a DC-voltage control system of the converter 10. In other words, actions are taken on the condition that the voltage across the DC voltage unit changes.

With this arrangement, by the feed forward control for the power $P_m$, changes in the voltage across the DC voltage unit as described above can be minimized, and thus the power is stably supplied. Therefore, corresponding fundamental waves at the AC power supply G and the AC motor M can be stably synchronized.

(12) Sixteenth Aspect of the Embodiment

As described in the embodiments, the current ripple through the DC coupling unit 30, such as a cable, changes depending on a state, for the converter 10 and the inverter 20, of the fundamental waves of the AC-voltage sides, the fundamental waves of the AC-currents, and the carrier waveforms. Basically, on the converter 10-side and the inverter 20-side, it is efficient to match respective frequencies for each of the fundamental waves of the AC-voltage sides, the fundamental waves of the AC-currents, and the carrier waveforms. In addition, in view of the fact that the current ripple through the DC coupling unit 30 can be reduced by adjusting the phase of each carrier waveform, it is sufficient when a control system to provide automated adjustments is configured. In particular, in order not to disturb the driving of the AC motor M as an initially intended purpose, a time constant of the automated adjustments is greater than a response time constant relating to the driving of the AC motor M. For example, it is sufficient when the time constant is about five times or more the response time constant. With this arrangement, the system can be stably operated, while allowing for reductions in a computing load of the control circuit.

(13) Seventeenth Aspect of the Embodiment

The power conversion system of the present disclosure can be used in various applications. As one example of the applications, a case where the present disclosure is applied to a known aircraft propulsion system as illustrated in FIG. 12 is described in one embodiment.

Figure 12:
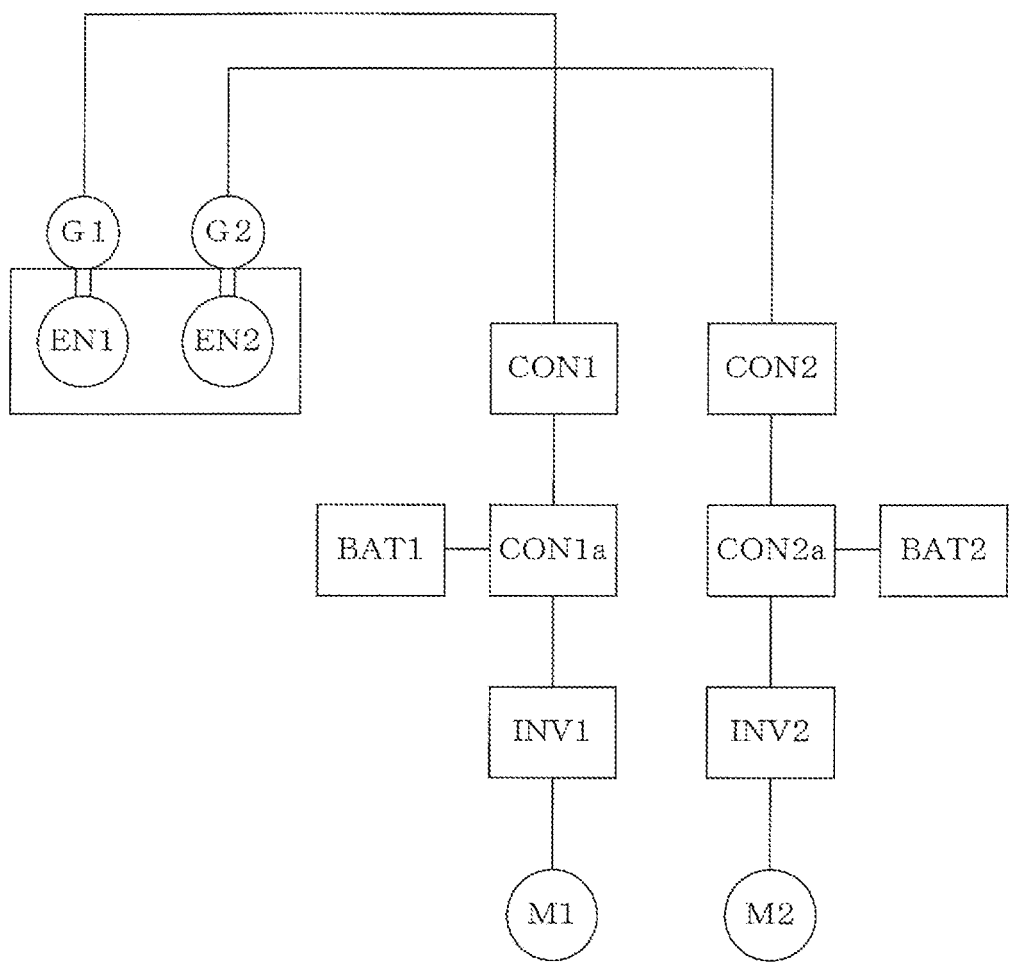
FIG. 12 is a diagram illustrating the configuration of an aircraft propulsion system to which the present disclosure is applied.

In FIG. 12, EN1 and EN2 indicate jet engines of an aircraft, and are coupled to generators G1 and G2, respectively. Converters CON1 and CON2 are coupled to the respective generators G1 and G2. Further, inverters INV1 and INV2 for driving corresponding motors M1 and M2 are respectively coupled to the generators G1 and G2 via converters CON1a and CON2a for charging and discharging the batteries BAT1 and BAT2. Each of the motors M1 and M2 constitutes an electric fan for propelling the aircraft. If the batteries BAT1 and BAT2 are not used, the converters CON1a and CON2a are not necessary, and thus the converters CON1 and CON2 are directly coupled to the inverters INV1 and INV2 via cables as DC coupling units, respectively.

A basic configuration of the aircraft propulsion system can be considered to include two power conversion systems as illustrated in FIGS. 1A and 1B.

A propulsion motor for the aircraft requires a large output of several hundreds of kilowatts to several megawatts. With this arrangement, it is important to improve the system efficiency and to reduce the generated heat. In addition, in view of the fact that it is extremely important to make the system lighter in weight, pulsations of the current flowing through a cable between the converter and the inverter are likely to increase, because capacitance of a voltage-smoothing capacitor used in each of the converter and the inverter needs to be minimized.

In this case, in the application of the present disclosure, a capacitor having small capacitance is used in a given DC voltage unit of each of the converter and the inverter, and the current ripple through a given cable is suppressed, thereby reducing generated heat and improving system efficiency.

A superconducting cable may be also used as a DC coupling unit. In this case, it is particularly effective to apply the present disclosure, because losses occur in a superconductor due to the flow of a radio frequency current, which may interfere with the maintaining of a superconducting state. Application of the present disclosure is particularly effective in terms of this aspect.

Although the above description is mainly provided using a three phase power conversion system, the present disclosure is not limited thereto, and is also applicable to a power conversion system having any other number of phases.

According to one aspect of the present disclosure, without adding any new element or component, pulsations in the current flowing through a DC coupling unit between a converter and an inverter can be reduced to thereby reduce losses due to a pulsating current and to stabilize a control. In addition, an extent to which a capacitor of a DC voltage unit reduces a pulsating current is attenuated to reduce capacitance of the capacitor, thereby allowing reductions in a device size and costs.

What is claimed is:

1. A power conversion system comprising:
an AC power supply;
a converter configured to convert AC power of the AC power supply into DC power, by PWM control;
an inverter configured to convert the DC power output from the converter into AC power, by PWM control, to supply the AC power to an AC motor;
a first capacitor coupled in a DC voltage unit of the converter;
a second capacitor coupled in a DC voltage unit of the inverter; and
a DC coupling unit that couples the first capacitor and the second capacitor, the DC coupling unit including an inductance component,
wherein a switching frequency of each of the converter and the inverter is set to be the same and the switching frequency is higher than a resonance frequency of a resonance circuit that includes the first capacitor, the second capacitor, and the DC coupling unit, and
wherein a switching operation of at least one of the converter or the inverter is controlled such that phases of predetermined components of voltage ripples, at the first capacitor and the second capacitor, that are respectively generated by switching operations of the converter and the inverter are substantially matched.

2. The power conversion system according to claim 1, wherein a PWM pulse to be applied to each of the converter and the inverter is generated by comparing a voltage command against a carrier waveform, and
wherein a converter-side carrier waveform and an inverter-side carrier waveform are set to have a same frequency, the converter-side carrier waveform and the inverter-side carrier waveform having a predetermined phase relationship.

3. The power conversion system according to claim 2, wherein the number of phases for each of the AC power supply and the AC motor is set to be the same,
wherein at least one of the converter or the inverter is controlled such that respective fundamental waves of one-phase voltages of the AC power supply and the AC motor have a same frequency and are substantially in phase, and
wherein respective phases of the converter-side carrier waveform and the inverter-side carrier waveform are set to be opposite to each other.

4. The power conversion system according to claim 2, wherein the number of phases for each of the AC power supply and the AC motor is set to be the same,
wherein at least one of the converter or the inverter is controlled such that respective fundamental waves of one-phase voltages of the AC power supply and the AC motor have a same frequency and are substantially opposite in phase, and wherein phases of the converter-side carrier waveform and the inverter-side carrier waveform are matched.

5. The power conversion system according to claim 1, wherein at least one of the converter or the inverter includes a plurality of power conversion units in which respective DC voltage units are coupled in parallel.

6. The power conversion system according to claim 5, wherein a switching frequency of each of the plurality of power conversion units is set to be the same, and
wherein timings of pulses that are respectively generated in DC bus currents in the plurality of power conversion units, which constitute the converter or the inverter, are staggered.

7. The power conversion system according to claim 6, wherein the timings of the pulses that are respectively generated of the DC bus currents in the plurality of power conversion units are substantially uniformly distributed.

8. The power conversion system according to claim 6, wherein respective switching frequency components of voltage ripples at the first capacitor of the converter and the second capacitor of the inverter are substantially in phase, and
wherein harmonic components of switching frequencies are canceled by staggering the timings of the pulses that are respectively generated in the DC bus currents of the plurality of power conversion units.

9. The power conversion system according to claim 6, wherein switching frequency components of a given voltage ripple at the first capacitor or the second capacitor are canceled by staggering the timings of the pulses that are respectively generated in the DC bus currents of a corresponding plurality of power conversion units, and
wherein harmonic components of a given switching frequency are canceled by setting the harmonic components to be substantially in phase.

10. The power conversion system according to claim 6, wherein a PWM pulse that is applied to each of the plurality of power conversion units is generated by comparing a voltage command against a carrier waveform, given carrier waveforms being set to have a same frequency, and a predetermined phase relationship being provided between the given carrier waveforms, and
wherein carrier waveforms used for the converter and the inverter are set to have a same frequency, the carrier waveforms having a predetermined phase relationship.

11. The power conversion system according to claim 10, wherein the number of phases for each of the AC power supply and the AC motor is set to be the same and a frequency of a fundamental wave of each AC-side voltage is set to be the same, and
wherein, for the plurality of power conversion units in each of the converter and the inverter, an amplitude of the fundamental wave of a corresponding AC-side voltage is set to be substantially the same and an amplitude of a fundamental wave of a corresponding AC-side current is set to be substantially the same.

12. The power conversion system according to claim 5, wherein, in a case where a portion of the plurality of power conversion units is stopped, phases of predetermined components of respective voltage ripples due to switching, for the first capacitor of the converter and the second capacitor of the inverter, are controlled so as to be substantially matched.

13. The power conversion system according to claim 1, wherein the AC power supply is an AC generator that is driven with an external force, and
wherein a current generated by the AC generator is controlled by the converter such that an average magnitude of a DC voltage of the converter or the inverter is set to be a predetermined magnitude, a frequency of the current generated by the AC generator being provided to the inverter as a magnitude that corresponds to a frequency command for the AC motor.

14. The power conversion system according to claim 1, wherein the AC power supply is an AC generator that is driven with an external force, and
wherein a current generated by the AC generator is controlled by the converter such that an average magnitude of a DC voltage of the converter or the inverter is set to a predetermined magnitude, a frequency of a current of the AC motor being provided to a controller for the external force, and the frequency being used as a magnitude that corresponds to a frequency command for the AC generator.

15. The power conversion system according to claim 13, wherein an amount corresponding to output power of the inverter is added to an amount corresponding to an input power command for the converter.

16. The power conversion system according to claim 14, wherein an amount corresponding to output power of the inverter is added to an amount corresponding to an input power command for the converter.

17. The power conversion system according to claim 1, wherein at least one of
a mutual phase relationship between carrier waveforms that are respectively used in the PWM control for the converter and the inverter,
a mutual phase relationship between respective fundamental waves of AC-side voltages of the converter and the inverter, or
a mutual phase relationship between respective fundamental waves of AC-side currents of the converter and the inverter, is adjusted so as to reduce a current ripple flowing through the DC coupling unit.

18. The power conversion system according to claim 1, wherein the power conversion system is configured to drive the AC motor that is used in an electric fan for propelling an aircraft.

* * * * *